(12) United States Patent
Noda

(10) Patent No.: US 11,433,764 B2
(45) Date of Patent: Sep. 6, 2022

(54) APPARATUS FOR OPENING AND CLOSING A LID OF A VEHICLE

(71) Applicant: ANSEI CORPORATION, Obu (JP)

(72) Inventor: Masaaki Noda, Nagoya (JP)

(73) Assignee: ANSEI CORPORATION, Obu (JP)

( * ) Notice: Subject to any disclaimer, the term of this patent is extended or adjusted under 35 U.S.C. 154(b) by 0 days.

(21) Appl. No.: 16/814,488

(22) Filed: Mar. 10, 2020

(65) Prior Publication Data

US 2021/0070165 A1 Mar. 11, 2021

(30) Foreign Application Priority Data

Sep. 6, 2019 (JP) .............................. JP2019-162890

(51) Int. Cl.
*E05F 15/00* (2015.01)
*B60K 15/05* (2006.01)
(Continued)

(52) U.S. Cl.
CPC ................ *B60K 15/05* (2013.01); *E05C 5/02* (2013.01); *E05F 15/611* (2015.01);
(Continued)

(58) Field of Classification Search
CPC ....... E05F 15/73; E05F 15/622; E05F 15/603; E05F 15/611; F16D 28/00; F16D 67/02;
(Continued)

(56) References Cited

U.S. PATENT DOCUMENTS

2010/0242363 A1* 9/2010 Hirota ..................... E05F 15/41
318/473
2014/0291996 A1 10/2014 Basavarajappa et al.
(Continued)

FOREIGN PATENT DOCUMENTS

CN 109532473 A 3/2019
DE 102015005303 A1 10/2016
(Continued)

OTHER PUBLICATIONS

Extended European Search Report from the European Patent Office dated Oct. 5, 2020, in related EP application No. 20 16 1445, including Search Opinion, Search Report and examined claims 1-12.
(Continued)

*Primary Examiner* — Chi Q Nguyen
(74) *Attorney, Agent, or Firm* — J-Tek Law PLLC; Jeffrey D. Tekanic; Scott T. Wakeman

(57) ABSTRACT

An apparatus (1) for opening and closing a lid (lid body) of a vehicle includes a linearly-movable shaft (10) supported by a housing (90) such that the shaft is linearly movable along, and nonrotatable around, an axial center (X10); and a rotary shaft (30) supported by the shaft such that it is linearly movable along and rotatable around the axial center. A stopper mechanism (50, 60) selectively blocks or permits the shaft to move from moving from a second position to a first position. The shaft has a main body (11) disposed within the rotary shaft (30) and an elastic body (80) provided on a terminal end portion of the main body (11). The elastic body includes a cushioning part (81) on a tip, a sealing part (83) around the main body, and a connecting part (85) connecting the cushioning part to the sealing part within the main body.

20 Claims, 8 Drawing Sheets

(51) Int. Cl.
*E05F 15/611* (2015.01)
*E05C 5/02* (2006.01)

(52) U.S. Cl.
CPC ... *B60K 2015/053* (2013.01); *E05Y 2201/412* (2013.01); *E05Y 2201/426* (2013.01); *E05Y 2201/702* (2013.01); *E05Y 2800/12* (2013.01); *E05Y 2800/422* (2013.01); *E05Y 2900/534* (2013.01)

(58) Field of Classification Search
CPC .... F16D 7/00; F16H 1/28; B60J 5/101; B60K 15/05; B60K 2015/0538; B60K 2015/053; E05C 5/02; E05Y 2201/42; E05Y 2800/12; E05Y 2201/426; E05Y 2800/422; E05Y 2900/534; E05Y 2201/702; E05Y 2201/412
USPC .......... 49/334, 348, 349, 324, 341, 340, 339
See application file for complete search history.

(56) References Cited

U.S. PATENT DOCUMENTS

| | | | |
|---|---|---|---|
| 2015/0115620 A1 | 4/2015 | Ito et al. | |
| 2016/0348408 A1 | 12/2016 | Watanabe | |
| 2017/0043660 A1 | 2/2017 | Horikawa et al. | |
| 2018/0029469 A1 | 2/2018 | Persiani et al. | |
| 2018/0105036 A1 | 4/2018 | Guardianelli | |
| 2020/0156612 A1* | 5/2020 | Ikuma | F16C 19/188 |
| 2020/0217122 A1* | 7/2020 | Noguchi | E05F 15/619 |
| 2021/0039620 A1* | 2/2021 | Mitsugi | F16D 55/226 |
| 2021/0061092 A1 | 3/2021 | Noda | |
| 2021/0156177 A1 | 5/2021 | Noda | |
| 2021/0172234 A1* | 6/2021 | Rampalli | B60J 5/102 |

FOREIGN PATENT DOCUMENTS

| | | |
|---|---|---|
| DE | 102015005646 A1 | 11/2016 |
| EP | 1227948 B1 | 12/2003 |
| EP | 3078531 A1 | 10/2016 |
| EP | 3078792 A1 | 10/2016 |
| EP | 3265333 A1 | 1/2018 |
| EP | 3348432 A1 | 7/2018 |
| JP | H0482176 U | 7/1992 |
| JP | 2003113687 A | 4/2003 |
| JP | 2015086606 A | 5/2015 |
| JP | 2015132085 A | 7/2015 |
| JP | 2015209689 A | 11/2015 |
| JP | 2016223150 A | 12/2016 |
| JP | 2017043893 A | 3/2017 |
| JP | 2017043894 A | 3/2017 |
| JP | 2017043939 A | 3/2017 |
| JP | 6350451 B2 | 7/2018 |
| JP | 3219522 U | 12/2018 |
| WO | 0128798 A1 | 4/2001 |
| WO | 2016139690 A1 | 9/2016 |

OTHER PUBLICATIONS

Extended European Search Report from the European Patent Office dated Feb. 12, 2021 in related EP application No. 20190279.8, including Search Opinion, Search Report and examined claims 1-9.
Machine Translation of Search Report from the Japanese Patent Office dated Jan. 26, 2022, in related JP application No. 2019-162890, which includes translation of examined claims 1-3.
Office Action and Search Report from the Japanese Patent Office dated Feb. 1, 2022 in related JP application No. 2019-211949; including machine translation thereof and of examined claims 1-9.
Office Action and Search Report from the Japanese Patent Office dated Feb. 1, 2022, in related JP application No. 2019-153422, including machine translation thereof and of examined claims 1-5.
Office Action from the European Patent Office dated Nov. 18, 2021 in related EP application No. 20161445.0, including examined claims 1-12.
Office Action from the European Patent Office dated Nov. 18, 2021 in related EP application No. 20161722.2, including examined claims 1-9.
Extended European Search Report from the European Patent Office dated Oct. 6, 2020 in related EP application No. 20 16 1722, including Search Opinion and Search Report.
Unpublished U.S. Appl. No. 16/814,391.
Unpublished U.S. Appl. No. 16/986,847.
Office Action dated May 19, 2022, in related U.S. Appl. No. 16/814,391.

* cited by examiner

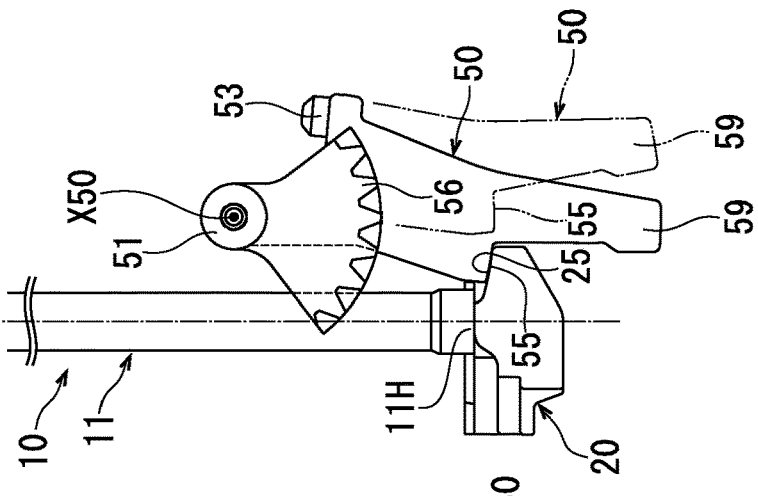
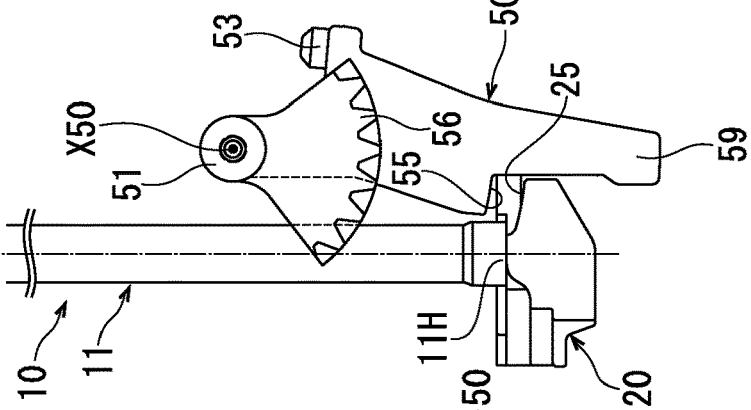
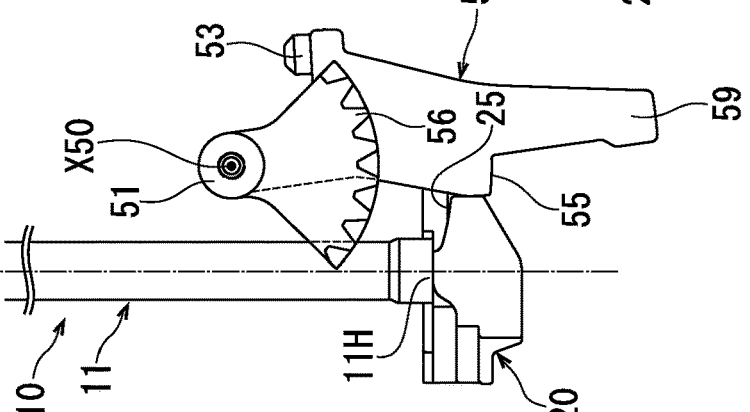
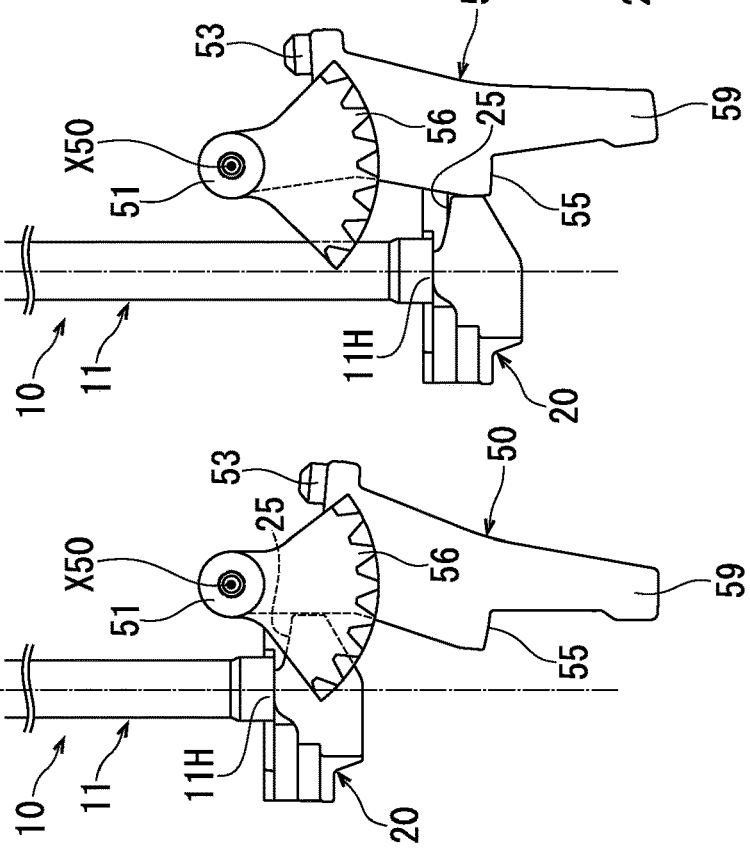

APPARATUS FOR OPENING AND CLOSING A LID OF A VEHICLE

TECHNICAL FIELD

The present invention generally relates to an apparatus for opening and closing/latching a lid (lid body) of a vehicle.

BACKGROUND ART

Japanese Laid-open Patent Publication No. 2017-43939 discloses an example of a known lid-body opening/closing apparatus for use in vehicles, i.e. an apparatus for opening and closing a lid body of a vehicle. The lid body is a fuel door in this prior art document. This lid-body opening/closing apparatus is provided between an opening provided in the vehicle body and the lid body (fuel door) that is capable of opening/closing the opening. The lid body is displaceable (pivotable) in a pivot range that includes an open position at which the opening is open, and a closed position at which the opening is closed.

This lid-body opening/closing apparatus comprises a housing, a linearly-movable shaft, a rotary shaft, and a stopper mechanism. The housing is provided on the vehicle body.

The linearly-movable shaft extends centered on an axial center passing through (intersecting) the opening. The linearly-movable shaft is capable of undergoing linear reciprocating motion in (along) direction of the axial center in a linear range that includes a first position corresponding to the open position and a second position corresponding to the closed position, is supported by the housing such that it is nonrotatable around the axial center, and is biased toward the first position.

The rotary shaft also extends in a shape that is substantially cylindrical and centered on the axial center. The rotary shaft is mounted around the linearly-movable shaft such that it is capable of undergoing linear reciprocating motion in (along) the direction of the axial center and is rotatable around the axial center. If the linearly-movable shaft is in the second position, then the rotary shaft rotates to a latched position that latches the lid body; and on the other hand, if the linearly-movable shaft is in the first position, then it rotates to an unlatched position that does not latch the lid body.

The stopper mechanism is provided on the housing, and comprises a latch, a pawl, and an electric actuator. The stopper mechanism switches between a blocking state that prohibits the linearly-movable shaft from moving from the second position to the first position, and a nonblocking state that permits the linearly-movable shaft to move from the second position to the first position.

In the known lid-body opening/closing apparatus having the above-mentioned configuration, the lid body is held in the closed position by the stopper mechanism switching to the blocking state when the lid body is displaced from the open position to the closed position. On the other hand, in the lid-body opening/closing apparatus, upon being induced by a manual opening operation for displacing the lid body to the open position, by virtue of the stopper mechanism switching to the nonblocking state, the linearly-movable shaft is biased away from the second position and is moved to the first position, causing the lid body to displace to the open position and the rotary shaft to rotate to the unlatched position, thereby releasing the latching of the lid body.

In addition, in the lid-body opening/closing apparatus, the linearly-movable shaft comprises a linearly-movable-shaft main body and a cap. The linearly-movable-shaft main body is inserted within the rotary shaft. The cap is assembled at the tip of the linearly-movable-shaft main body.

However, in the above-mentioned known lid-body opening/closing apparatus, there is a risk that foreign matter, such as dust and liquids, may ingress into a gap between the rotary shaft and the linearly-movable shaft main body via a gap between the cap and the rotary shaft. In addition, there is a risk that the cap may be subjected to backlash with respect to the linearly-movable-shaft main body owing to the impact when the cap makes contact with the lid body. As a result, with this lid-body opening/closing apparatus, there is a problem in that the closure-tightness capability, which holds the lid body in the closed position, may decrease, abnormal noises may occur more readily, or the like.

SUMMARY OF THE INVENTION

Accordingly, one non-limiting object of the present teachings is to provide an apparatus for opening and closing/latching a lid (lid body) of a vehicle (a lid-body opening/closing apparatus for use in vehicles) that can avoid a decrease in the closure-tightness capability, which holds the lid (lid body) in the closed position and/or can reduce the occurrence of abnormal noise.

In one aspect of the present teachings, an apparatus for opening and closing/latching a lid of a vehicle (a lid-body opening/closing apparatus for use in vehicles) is provided (or is configured/adapted to be provided) between an opening, which is provided on a vehicle body, and the lid or a lid cover (lid body), which is capable of opening and closing the opening, wherein:

the lid (lid body) is displaceable (movable, pivotable) in a pivot range that includes: an open position at which the opening is open, and a closed position at which the opening is closed; and the apparatus comprises:

a housing provided (or configured/adapted to be provided) on the vehicle body;

a linearly-movable shaft that: (i) extends centered on an axial center passing through the opening, (ii) is supported by the housing such that the linearly-movable shaft is capable of undergoing linear reciprocating motion in (along) the direction of the axial center in a linear range that includes a first position corresponding to the open position, and a second position corresponding to the closed position, and such that the linearly-movable shaft is nonrotatable around the axial center, and (iii) is biased toward the first position;

a rotary shaft that (i) extends in a substantially cylindrical shape centered on the axial center, and (ii) is mounted around the linearly-movable shaft such that the rotary shaft is capable of undergoing linear reciprocating motion in (along) the direction of the axial center, and such that the rotary shaft is rotatable around the axial center; wherein, when the linearly-movable shaft is disposed in the second position, it rotates to a latched position that latches the lid body; and when the linearly-movable shaft is disposed in the first position, it rotates to an unlatched position that does not latch the lid body; and a stopper mechanism that is provided on the housing and is switchable between a blocking state, in which movement of the linearly-movable shaft from the second position to the first position is prohibited, and a nonblocking state, in which movement of the linearly-movable shaft from the second position to the first position is permitted;

wherein:

the linearly-movable shaft comprises:

a linearly-movable-shaft main body, which is inserted through the interior of the rotary shaft; and an elastic body, which is provided on (at) the tip of the linearly-movable-shaft main body and is composed of a material softer (more elastic) than the material constituting the linearly-movable-shaft main body; and the elastic body comprises:

a cushioning part, which protrudes from the linearly-movable-shaft main body toward the lid (lid body);

a sealing part, which makes ring-shaped contact within the rotary shaft; and a connecting part, which connects the cushioning part and the sealing part within the linearly-movable-shaft main body.

With the above-mentioned apparatus for opening and closing/latching a lid of a vehicle (vehicular-use lid-body opening/closing apparatus) of the present teachings, because the sealing part seals the gap between the rotary shaft and the linearly-movable-shaft main body, it is possible to inhibit the ingress of foreign matter, such as dust and liquids, into that gap. In addition, the cushioning part protrudes from the linearly-movable-shaft main body toward the lid (lid body) and absorbs the impact at the time that the tip (cushioning part) of the linearly-movable shaft comes into contact with the lid (lid body). For this reason, in such an apparatus for opening and closing/latching the lid of a vehicle (lid-body opening/closing apparatus), impacts tend not to act on the linearly-movable-shaft main body and the rotary shaft, and therefore backlash between the linearly-movable-shaft main body and the rotary shaft can be reduced.

Accordingly, with such an apparatus for opening and closing/latching a lid of a vehicle (vehicular-use lid-body opening/closing apparatus) of the present teachings, it is possible to avoid a decrease in the closure-tightness capability, which holds the lid body in the closed position, and/or reduce the occurrence of abnormal noise. In addition, because such an apparatus for opening and closing/latching a lid of a vehicle (lid-body opening/closing apparatus) is configured such that the cushioning part and the sealing part are connected by (via) the connecting part within the linearly-movable-shaft main body, the linearly-movable-shaft main body and the elastic body can be easily integrated by a manufacturing process, for example, two-color molding (e.g., multi-material injection molding), that includes processes having a plurality of steps. Therefore, it is possible to achieve a reduction in the part count and a simplification of the assembly work, and, in turn, to lower manufacturing costs. In addition, because the cushioning part is connected by the connecting part to the sealing part, the cushioning part is not readily separated (detached) from the linearly-movable-shaft main body and is reinforced by the linearly-movable-shaft main body. Therefore, durability is improved and the volume of the cushioning part can be increased, thereby increasing the impact-absorbing performance (capability) of the cushioning part.

In another aspect of the present teachings, the cushioning part preferably protrudes in a tapered manner toward the lid (lid body). In such an embodiment, the cushioning body can more effectively absorb an impact at the time that it comes into contact with the lid (lid body).

In another aspect of the present teachings, a flange part is preferably formed on (at, around) the tip of the linearly-movable-shaft main body such that it protrudes outward in the radial direction in a flange-like manner between the cushioning part and the sealing part and makes contact with an interior portion of the tip of the rotary shaft.

In such an embodiment, because the flange part of the linearly-movable-shaft main body, which is composed of a material harder (more rigid and/or less elastic) than that of the elastic body, contacts the interior portion of the tip of the rotary shaft (and thus serves as a surface that supports rotational movement of the rotary shaft about the linearly-movable shaft), the rotary shaft experiences less rotational resistance (friction) when rotating around the axial center than an embodiment in which the softer (elastic material) of the cushioning part were to rotationally support the rotary shaft. Therefore, the rotary shaft can rotate stably (smoothly) around the axial center.

Other aspects and advantages of the present invention should be clear from embodiments explained in the following description and shown in the attached drawings, from the illustrations shown on these drawings, and from the concept or gist of the present invention disclosed overall in the specification and these drawings.

BRIEF DESCRIPTION OF THE DRAWINGS

FIGS. 8A-8D are schematic diagrams used to describe the coordinated movements of a block of the linearly-movable shaft and the stopper.

DETAILED DESCRIPTION OF EMBODIMENTS

Embodiments of the present teachings are explained below, with reference to the drawings.

Embodiments

Figure 1:
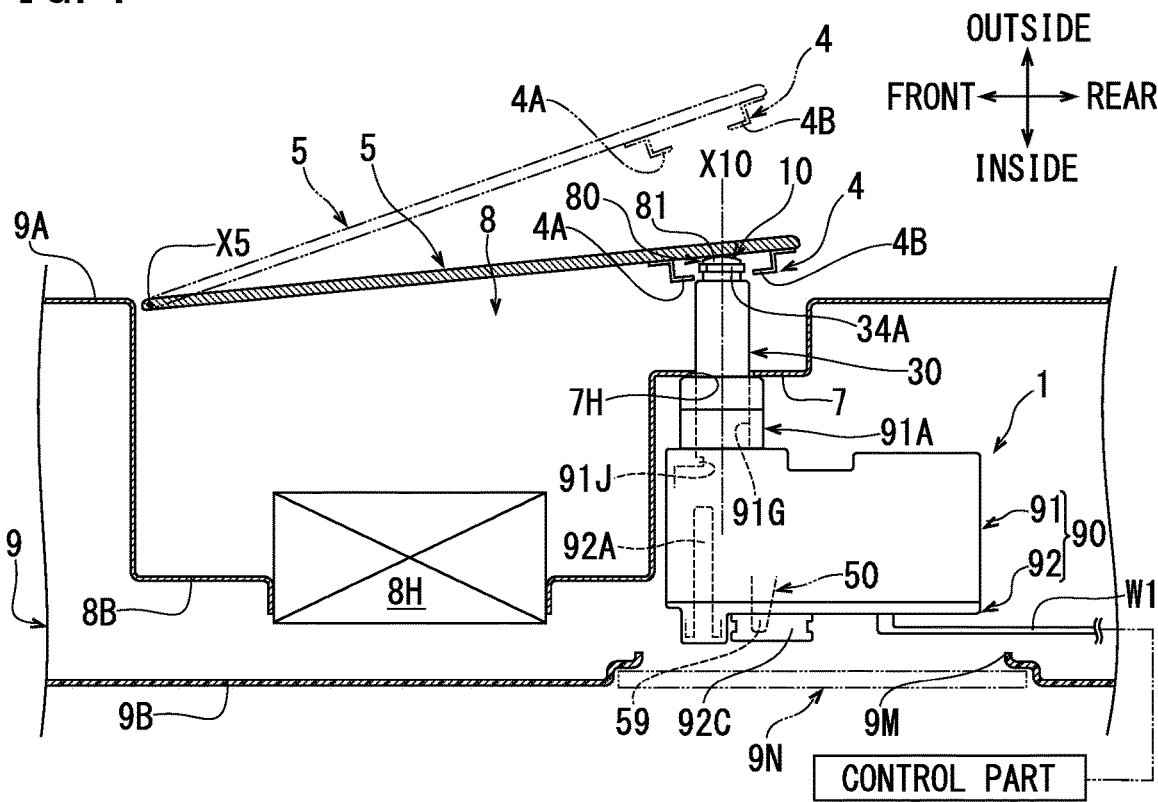
FIG. 1 is a schematic, partial, cross-sectional view of a vehicle that utilizes an apparatus for opening and closing/latching a fuel door (lid body) of a vehicle (hereinafter, lid-body opening/closing apparatus) according to one embodiment of the present teachings and shows the state in which the fuel door (lid body) is in an open position and a linearly-movable shaft is in a first position.
Figure 2:
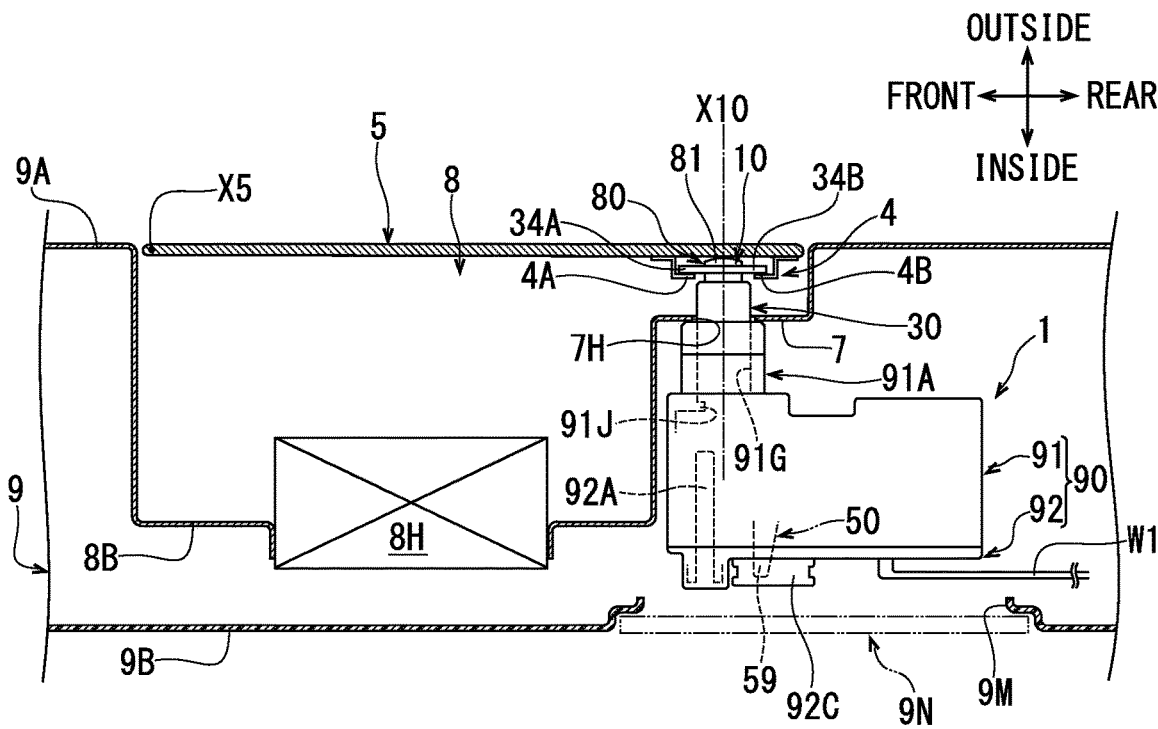
FIG. 2 is a schematic, partial, cross-sectional view of the apparatus of FIG. 1, and shows the state in which the fuel door (lid body) is in a closed position and the linearly-movable shaft is in a second position.
Figure 3:
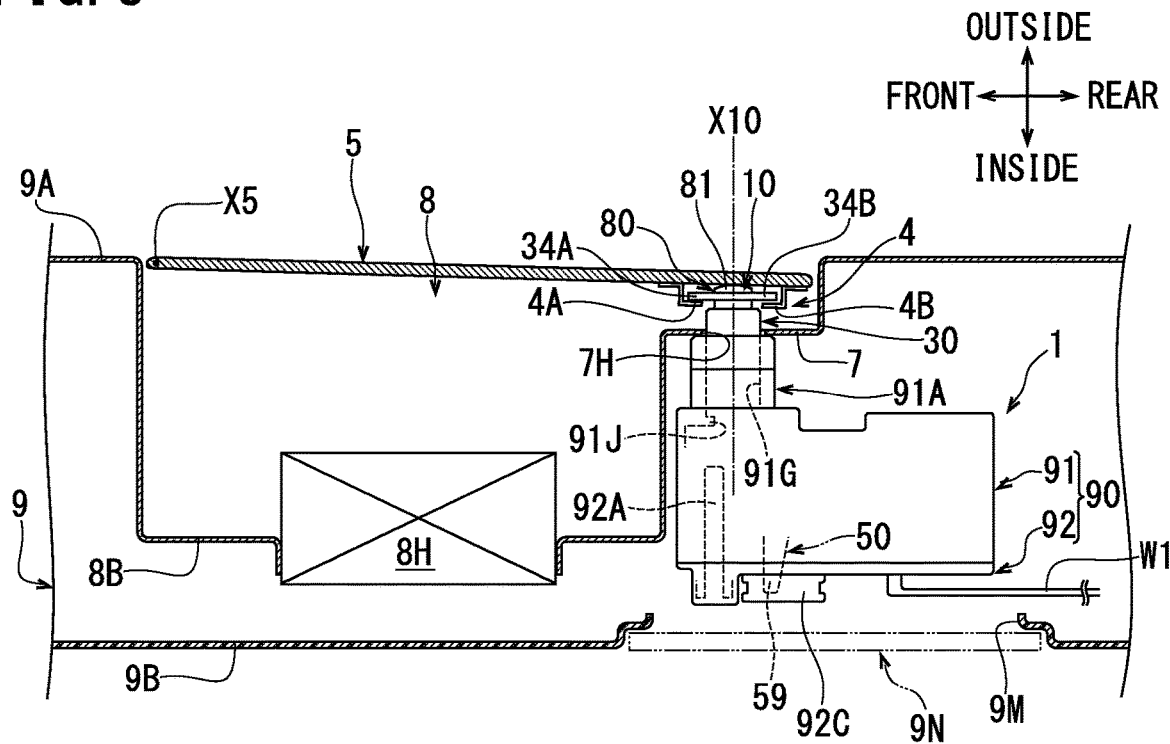
FIG. 3 is a schematic, partial, cross-sectional view of the apparatus of FIG. 1, and shows the state in which the fuel door (lid body) is in a pressed-in position and the linearly-movable shaft is in a third position.

As shown in FIGS. 1-4, an apparatus 1 for opening and closing/latching a fuel door of a vehicle (hereinafter, simply "lid-body opening/closing apparatus 1") of this working example is one example of a specific embodiment of a lid-body opening/closing apparatus of the present teachings. The fuel door of the working example is one example of a "lid" or "lid body" of the present teachings. The lid-body opening/closing apparatus 1 is designed to be utilized in a vehicle such as an automobile, a bus, an industrial vehicle, or the like. FIGS. 1-3 show a rear-side portion on the right-side surface of a vehicle body 9 of the vehicle.

The front and rear directions shown in FIGS. 1-3 are based on the front and rear directions of the vehicle. In addition, the vehicle-inside direction and the vehicle-outside direction shown in FIGS. 1-3 are based on the perspective of a person sitting inside the vehicle cabin, where the right-side surface of the vehicle is the vehicle outer side, and the opposite side is the vehicle inner side, i.e. the cabin side. Furthermore, the direction coming out of the plane of the paper in FIGS. 1-3 is the upper side of the vehicle, i.e. the roof side, whereas the direction going back from the plane of the paper in FIGS. 1-3 is the lower side of the vehicle, i.e. the floor side. The front-rear direction, the vehicle inside-outside direction, and the up-down direction in FIG. 4 and thereafter are shown corresponding to FIGS. 1-3.

Configuration of the Vehicle Opening, Fuel Door (Lid Body), Etc.

As shown in FIG. 1, the vehicle body 9 has a body panel 9A and an inner panel 9B. The body panel 9A constitutes a right-side exterior surface of the vehicle body 9. The inner panel 9B is disposed on the inner side of the vehicle relative to the body panel 9A and partitions off adjacent vehicle compartments such as the trunk.

An opening 8 is provided on the body panel 9A of the vehicle body 9. The opening 8 is a recessed part that is formed such that one portion of the body panel 9A recesses toward the inner side of the vehicle from the right-side surface of the vehicle body 9 and is open toward the right-side surface of the vehicle body 9. The opening 8 has a bottom wall 8B and a support wall 7.

The bottom wall 8B extends substantially planarly in the front-rear direction and the up-down direction, forming the bottom surface of the opening 8. A fuel-filling hole 8H is disposed in the center of the bottom wall 8B. In electric vehicles, the fuel-filling hole 8H is replaced with a charging port.

The support wall 7 extends substantially planarly in the front-rear direction and the up-down direction at a location rearward of the bottom wall 8B and on the vehicle outer side, forming a portion of the inner-wall surface of the opening 8. A through hole 7H is formed so as to pass through the support wall 7. The through hole 7H is a round hole centered on axial center X10. Axial center X10 extends in the vehicle inside-outside direction and passes through the opening 8.

A substantially planar fuel door (hereinafter, "lid body") 5 is supported on the body panel 9A of the vehicle body 9 such that it is pivotable about opening/closing axial center X5. Opening/closing axial center X5 extends in the up-down direction along an opening edge on the front side of the opening 8. The lid body 5 is pivotable in a pivot range that includes an open position shown in FIG. 1, a closed position shown in FIG. 2, and a pressed-in position shown in FIG. 3. Although the term "lid body" is utilized herein for the structure 5 that opens and closes the opening 8, other terms may be utilized, such as fuel door, fuel door cover, fuel lid, charging port cover, charging port door, charging port lid, etc. All of these terms are intended to be synonymous. For example and without limitation, it is noted that the term "fuel door" is meant to encompass both a lid that is pivotable about a hinge to uncover a liquid fuel opening and a lid that is pivotable about a hinge to uncover a charging port.

FIG. 1 shows, in solid line and chain double-dashed line, respectively, two exemplary open positions of the lid body 5. By pivoting to an open position, the lid body 5 is displaced (moved) to a position where its rearward end is disposed farther outward of the vehicle than the outer surface of the body panel 9A, thus opening the opening 8.

As shown in FIG. 2, by pivoting to the closed position, the outer surface of the lid body 5 is flush with the outer surface of the body panel 9A, thus constituting a portion of the design surface of the vehicle body 9, and also closing the opening 8.

As shown in FIG. 3, by pivoting to the pressed-in position, the lid body 5 is displaced (moved, pivoted) such that its rearward end is disposed farther toward the inner side of the vehicle than the outer surface of the body panel 9A, and is thus pressed inwardly of the body panel 9A on the side opposite the open position.

As shown in FIG. 2, a lid-body latching part 4, which includes a pair of latching flanges 4A, 4B, is fixed on the surface of the lid body 5 on the rearward end that faces the inner side of the vehicle. The front latching flange 4A and the rear latching flange 4B each protrude toward the inner side of the vehicle and then bend, extending so as to approach each other in the front-rear direction.

The tip of the front latching flange 4A and the tip of the rear latching flange 4B oppose one other with a prescribed spacing between them in the front-rear direction. When the lid body 5 is in the closed position, axial center X10 passes through an intermediate position between the tip of the front latching flange 4A and the tip of the rear latching flange 4B.

A maintenance opening 9M and an opening cover 9N are provided in/on the inner panel 9B of the vehicle body 9. The maintenance opening 9M is formed in the inner panel 9B rearward of the fuel-filling hole 8H. The maintenance opening 9M passes through the inner panel 9B and is sized such that the lid-body opening/closing apparatus 1 can pass through the maintenance opening 9M.

The opening cover 9N is removably mounted on the inner panel 9B, thereby closing the maintenance opening 9M. The opening cover 9N is removable, e.g., by an assembler at the time of attaching the lid-body opening/closing apparatus 1 during the manufacture of the vehicle or by a mechanic when performing work on the lid-body opening/closing apparatus 1 such as maintenance or repair work. Thereby, it is possible to perform the above-described work easily by inserting a hand into the space between the body panel 9A and the inner panel 9B via the opened maintenance opening 9M.

Configuration of the Lid-Body Opening/Closing Apparatus

As shown in FIGS. 1-3, the lid-body opening/closing apparatus 1 is provided between the opening 8 and the lid body 5 and is configured/adapted for opening and closing the lid body 5. The lid-body opening/closing apparatus 1 comprises a housing 90 as shown in FIGS. 1-4, a linearly-movable shaft 10 as shown in FIGS. 5-11, a rotary shaft 30 as shown in FIGS. 1-7 and FIG. 10, a compression-coil spring 10S as shown in FIG. 7, a stopper 50 as shown in FIGS. 5-8, and a compression-coil spring 50S as shown in FIG. 7. In addition, the lid-body opening/closing apparatus 1 comprises an electric actuator 60 shown in FIGS. 5-7, and a switch lever 70 and a switch SW1 shown in FIGS. 6 and 7. The stopper 50 and the electric actuator 60 are one representative, non-limiting example of a "stopper mechanism" according to the present teachings.

Housing

As shown in FIG. 1, the housing 90 is provided on the vehicle body 9 by being fastened to fixing members (not shown) disposed between the body panel 9A and the inner panel 9B of the vehicle body 9. As shown in FIGS. 1-4, the housing 90 has a housing body 91 and a housing case (housing cover) 92.

The housing body 91 is a substantially box-shaped body having an open side on the surface that faces the inner side of the vehicle. A tubular guide 91A is formed on a front portion of the surface of the housing body 91 facing the outer side of the vehicle. The tubular guide 91A has a circular-tube shape centered on axial center X10 and protrudes toward the outer side of the vehicle.

As shown in FIG. 1, the inner-circumferential surface of the tubular guide 91A serves as a guide surface 91G for enabling the linearly-movable shaft 10 and the rotary shaft 30 to undergo linear reciprocating motion in the direction of axial center X10. In addition, a guide protrusion 91J is formed on the inner side of the housing body 91 and enables the rotary shaft 30 to be rotatable around axial center X10.

As shown in FIGS. 1-4, the housing case 92 is assembled (mounted) on the open side of the housing body 91 having the surface that faces the inner side of the vehicle. The housing case 92, together with the housing body 91, partitions off (encloses) a storage space of (within) the housing 90.

Stored within the storage space of the housing 90 are: a portion of each of the linearly-movable shaft 10 and the rotary shaft 30 as well as the compression-coil spring 10S, the stopper 50, the compression-coil spring 50S, the electric actuator 60, the switch lever 70, and the switch SW1.

As shown in FIG. 1, a shaft-shaped guide 92A is formed on the front portion of the housing case 92 and enables the linearly-movable shaft 10 to undergo reciprocating motion in the direction of axial center X10. The shaft-shaped guide 92A has a circular-cylindrical shaft shape centered on an axial center that extends in parallel to axial center X10, i.e. the axial center of the shaft-shaped guide 92A is offset relative to axial center X10. Furthermore, the shaft-shaped guide 92A protrudes within the housing 90 toward the outer side of the vehicle.

Although omitted from FIGS. 1-3, the compression-coil spring 10S shown in FIG. 7 is mounted around the shaft-shaped guide 92A. In addition, although omitted from the figures, holding (support) parts are formed on the housing case 92 to respectively hold (support) the stopper 50, the compression-coil spring 50S, the electric actuator 60, the switch lever 70, and the switch SW1, which are shown in FIG. 7, together with the housing body 91.

Figure 4:
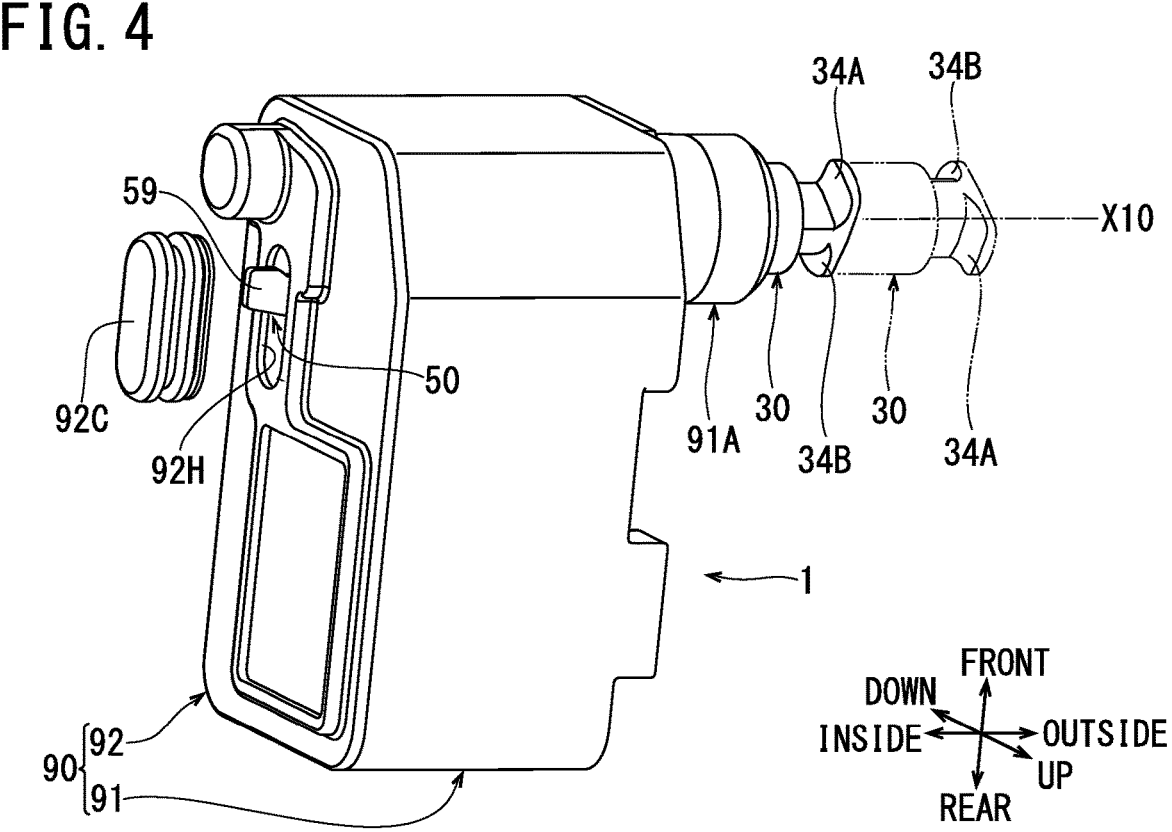
FIG. 4 is an oblique view of the apparatus according to the embodiment.

As shown in FIG. 4, a slot 92H extending in the front-rear direction is formed in the housing case 92 such that it passes through in the vehicle inside-outside direction. The slot 92H is covered by a rubber cap 92C as shown in FIGS. 1-4.

Linearly-Movable Shaft and Rotary Shaft

Figure 5:
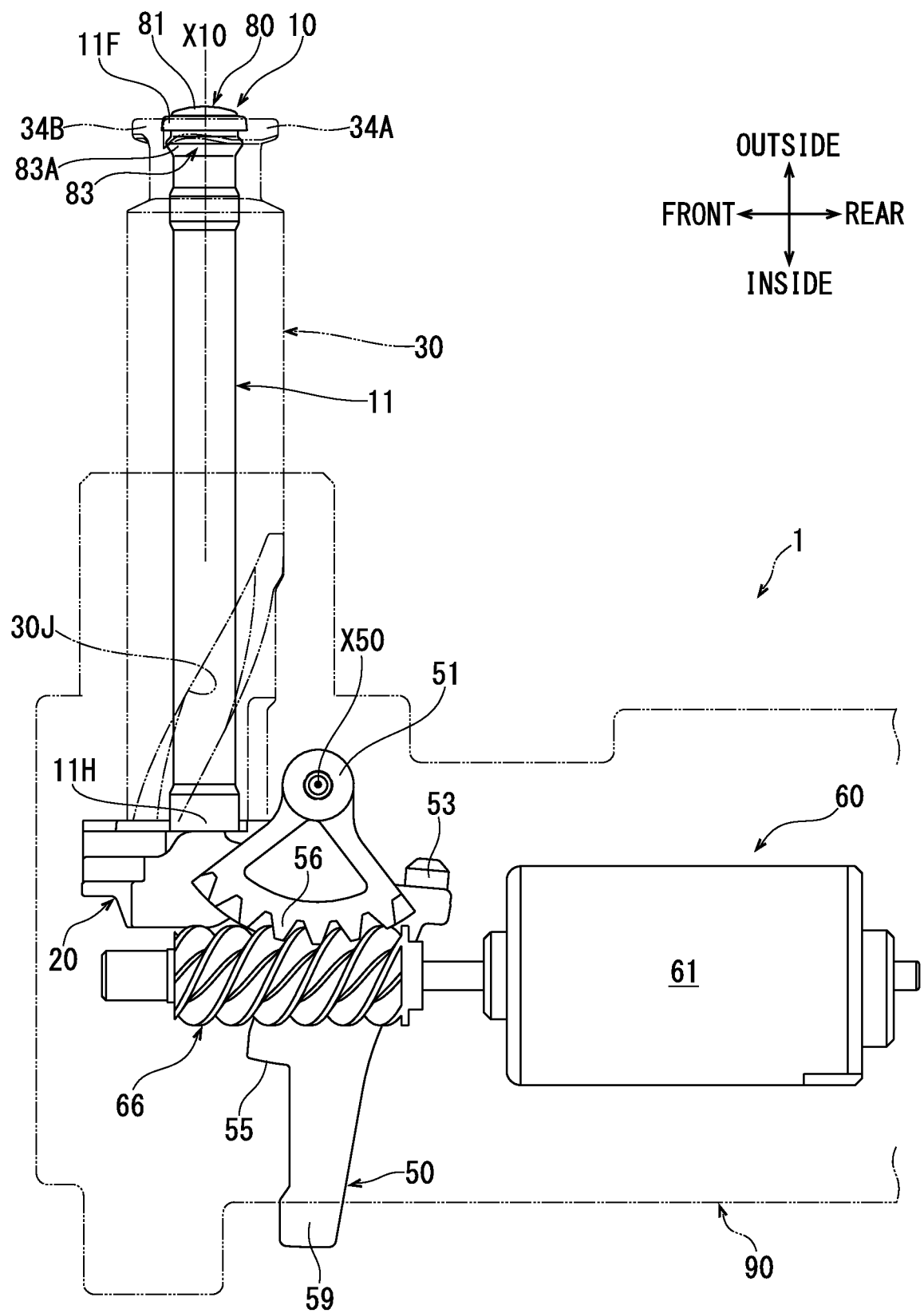
FIG. 5 is a top view that shows the positional relationships among the linearly-movable shaft, a rotary shaft, a stopper, and an electric actuator.
Figure 6:
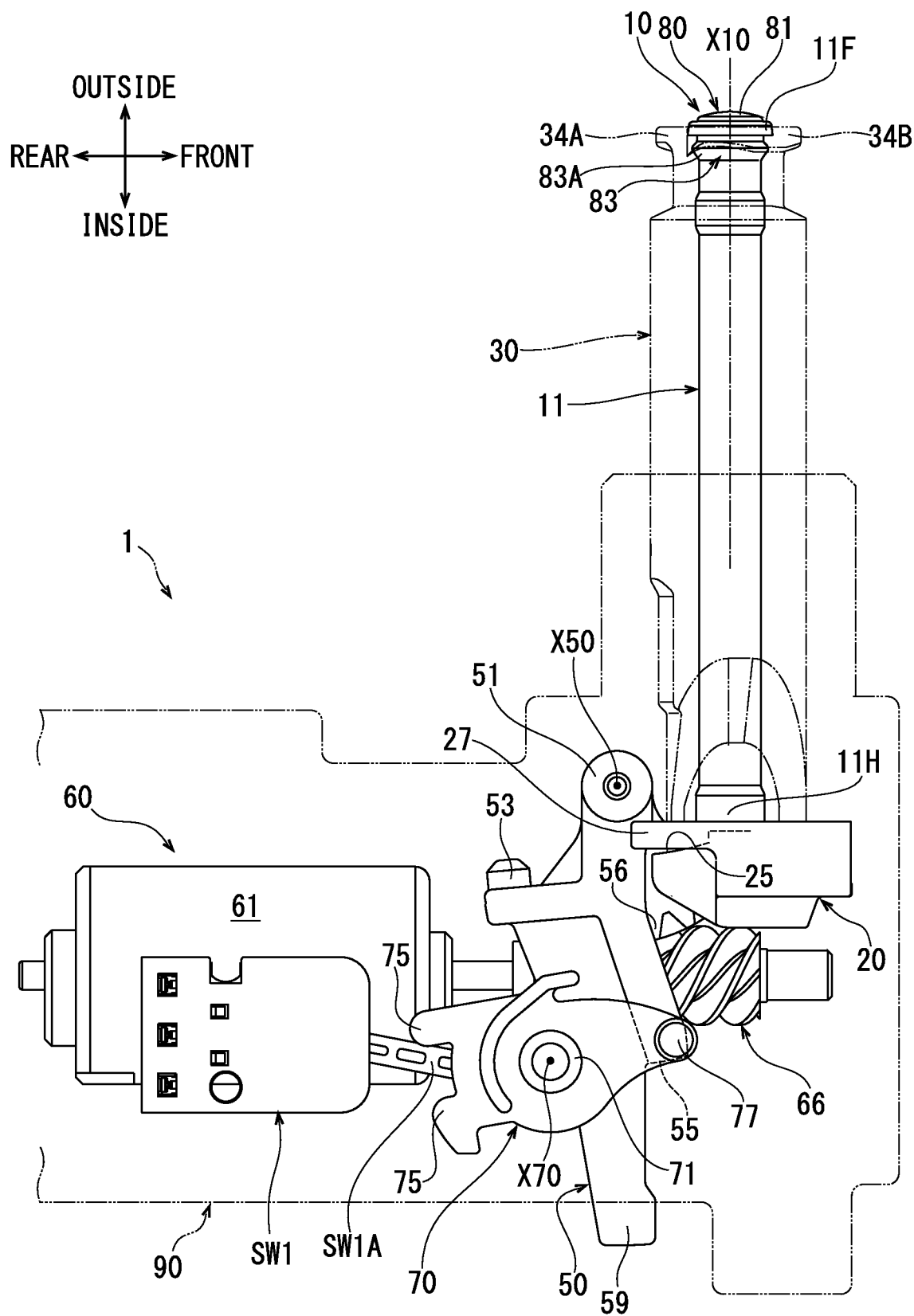
FIG. 6 is a bottom view that shows the positional relationships among the linearly-movable shaft, the rotary shaft, the stopper, the electric actuator, a switch lever, and a switch.
Figure 7:
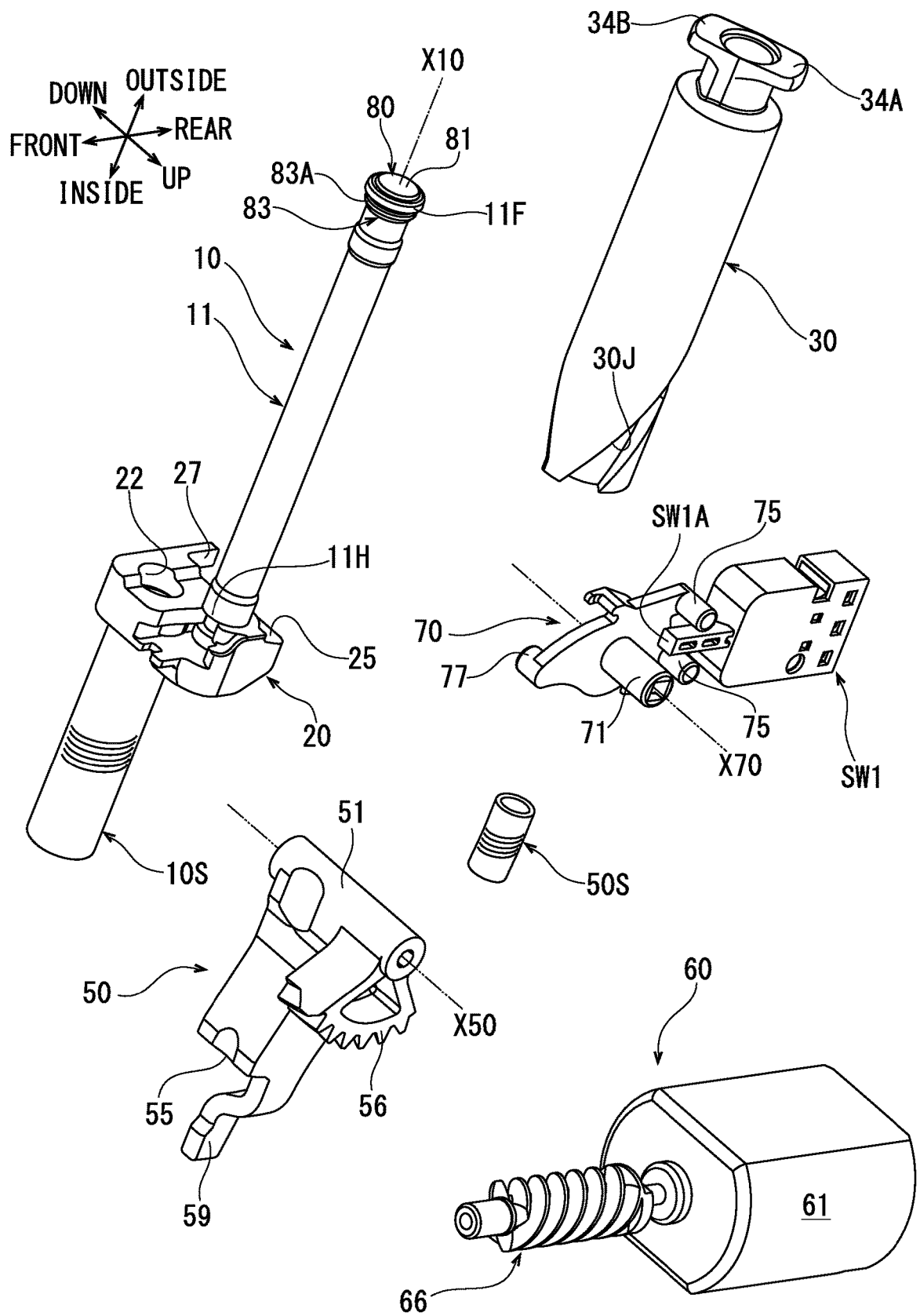
FIG. 7 is an exploded oblique view of the linearly-movable shaft, the rotary shaft, the stopper, the electric actuator, the switch lever, and the switch.

As shown in FIGS. 5-7, the linearly-movable shaft 10 comprises a linearly-movable-shaft main body 11, an elastic body 80, and a block (actuator/engagement flange) 20.

The linearly-movable-shaft main body 11 is made of polymer (resin) in the shape of a substantially circular-cylindrical shaft that extends centered on axial center X10. The linearly-movable-shaft main body 11 includes a base-end portion 11H, which is one end portion of the linearly-movable-shaft main body 11 that is located on the side opposite to the lid body 5 in the direction of axial center X10, i.e. on the inner side of the vehicle. A terminal end (tip) of the linearly-movable-shaft main body 11 is the other end portion of the linearly-movable-shaft main body 11 that is located on the lid body 5 side in the direction of axial center X10, i.e. toward the outer side of the vehicle.

A flange part 11F is formed on (at) the terminal end portion (tip) of the linearly-movable-shaft main body 11. The flange part 11F protrudes outward in the radial direction of axial center X10 more than other portions of the linearly-movable-shaft main body 11.

Figure 9:
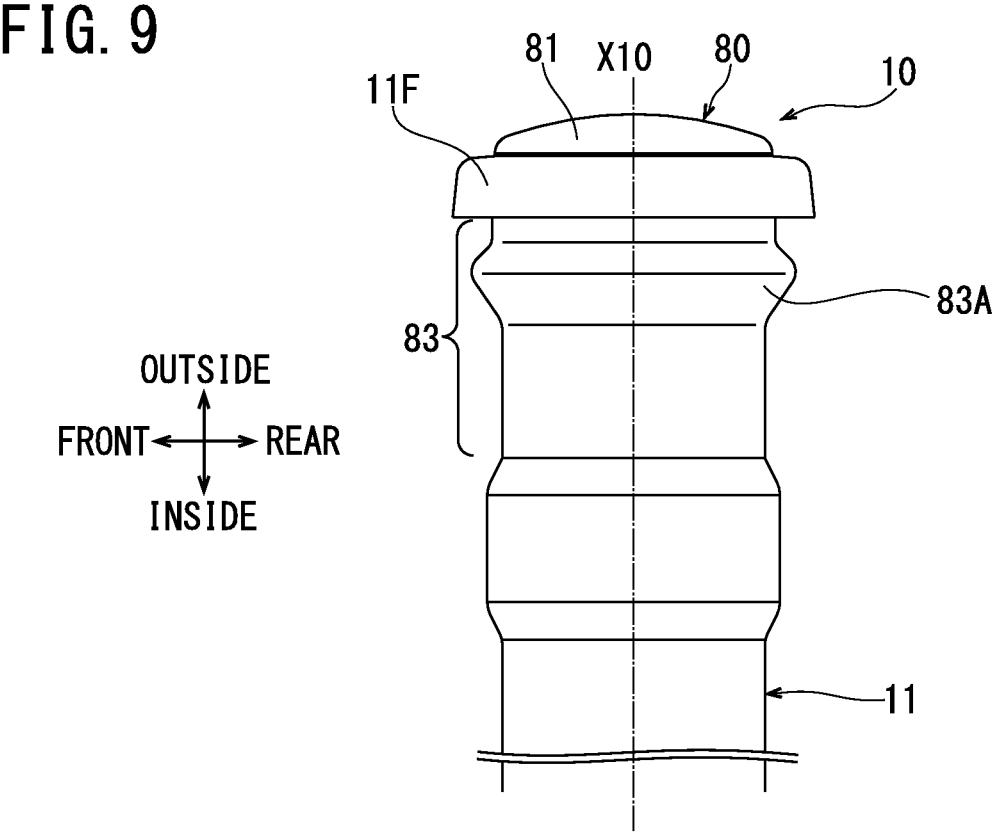
FIG. 9 is a partial side view of the linearly-movable shaft.
Figure 10:
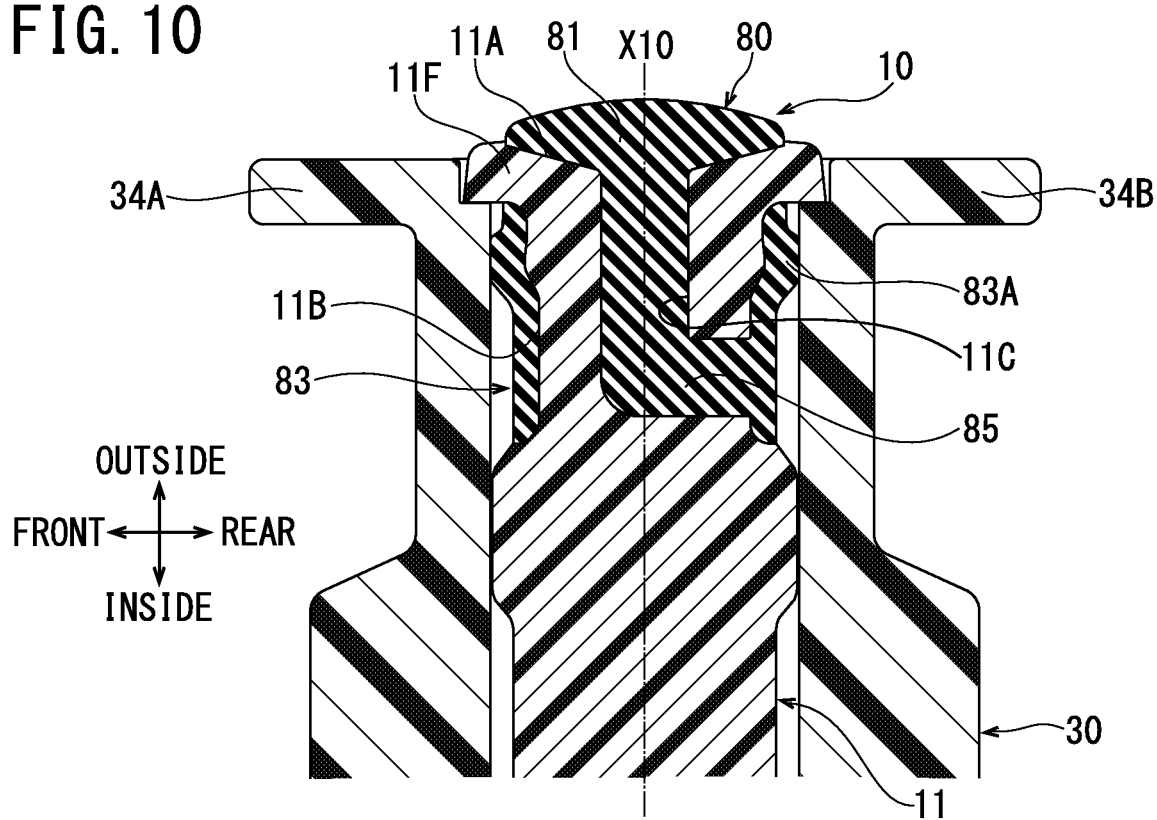
FIG. 10 is a partial, cross-sectional view of the linearly-movable shaft and the rotary shaft.

As shown in FIGS. 9 and 10, the elastic body 80 comprises: a cushioning part 81 and a sealing part 83, which are provided on (at) the terminal end portion (tip) of the linearly-movable-shaft main body 11; and a connecting part 85, which is provided in the interior of the terminal end portion (tip) of the linearly-movable-shaft main body 11. The connecting part 85 connects (physically links) the cushioning part 81 to the sealing part 83, as shown in FIG. 10.

In the present embodiment, the cushioning part 81, the sealing part 83, and the connecting part 85 of the elastic body 80 are formed integrally with the linearly-movable-shaft main body 11 by using a two-color molding process. Two-color molding comprises a first step of molding the linearly-movable-shaft main body 11 and a second step of molding the elastic body 80 integrally with the linearly-movable-shaft main body 11.

Figure 11:
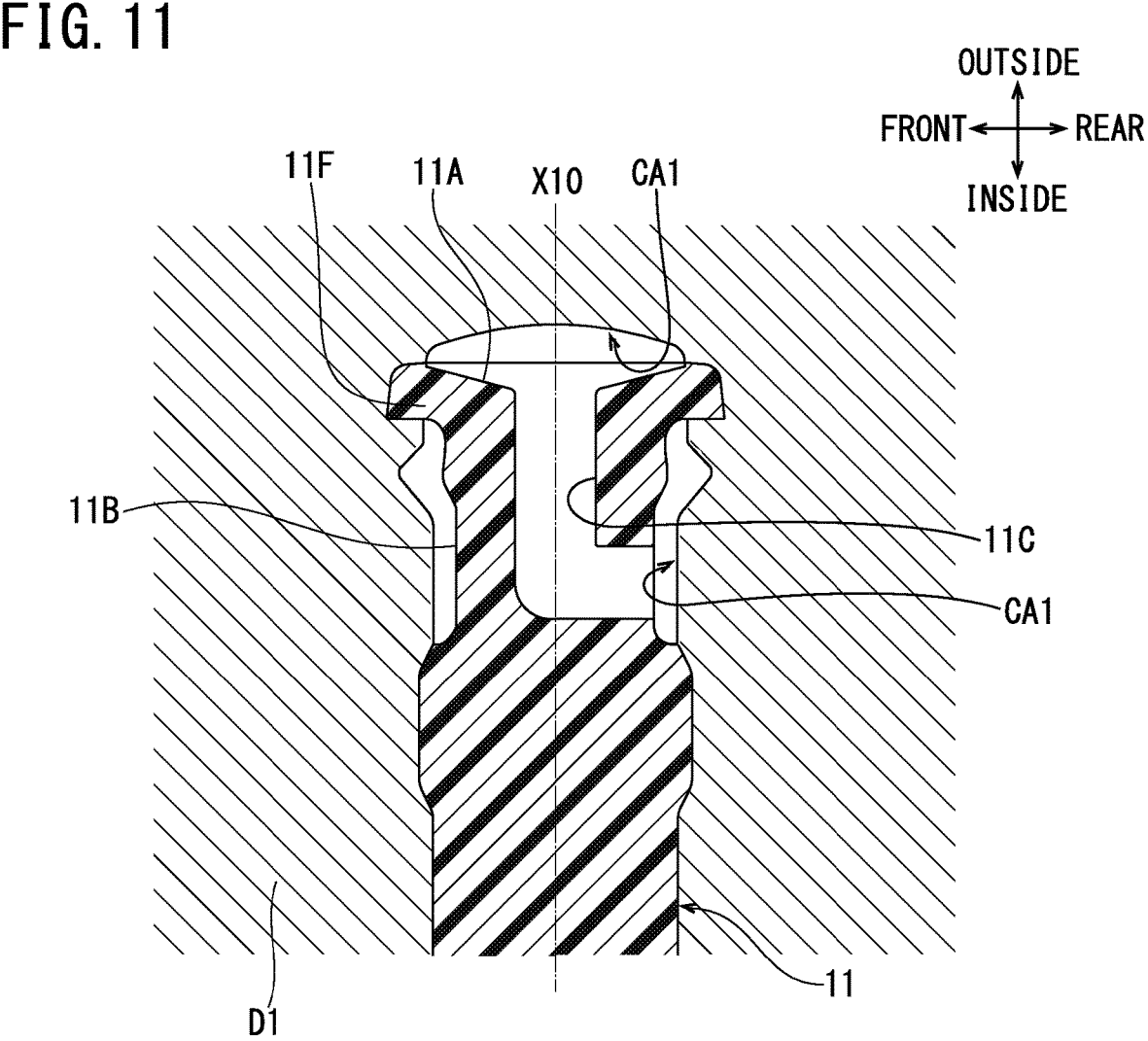
FIG. 11 is a partial, cross-sectional view that shows a cavity for forming a cushioning part, a sealing part, and a connecting part by using a two-color molding process.

In the first step, a slide core is used to mold a tip surface 11A, a tubular surface 11B, and a connection hole 11C in the linearly-movable-shaft main body 11 shown in FIG. 11. A cavity CA1 provided in the interior of a metal die D1 shown in FIG. 11 is designed for molding (shaping) the cushioning part 81, the sealing part 83, and the connecting part 85 in the second step. The cavity CA1 includes the tip surface 11A, the tubular surface 11B, and the connection hole 11C of the linearly-movable-shaft main body 11 molded in the first step. By filling the cavity CA1 with the material constituting the elastic body 80, the cushioning part 81, the sealing part 83, and the connecting part 85 are molded integrally with the linearly-movable-shaft main body 11.

The elastic body 80 is composed of a material that is softer (more elastic) than the material constituting the linearly-movable-shaft main body 11. Polymer (resin) materials that excel in strength and stiffness, such as hard nylon, ABS (acrylonitrile butadiene styrene), and polycarbonate, can be given as specific examples of the material constituting the linearly-movable-shaft main body 11. Materials that excel in elastic deformation performance, such as rubber (saturated or unsaturated), elastomers, and soft polymers (resins), can be given as specific examples of the material constituting the elastic body 80.

As shown in FIGS. 10 and 11, the tip surface 11A, which is designed to face the lid body 5 toward the outside of the vehicle, is formed in a bowl shape, centered on axial center X10, on the terminal end portion (tip) of the linearly-movable-shaft main body 11.

As shown in FIGS. 9 and 10, the cushioning part 81 is held on the tip surface 11A of the linearly-movable-shaft main body 11. The cushioning part 81 protrudes from the flange part 11F in a tapered (rounded) manner toward the outside of the vehicle, i.e. toward the lid body 5.

As shown in FIGS. 10 and 11, a substantially circular-tubular-shaped tubular surface 11B centered on axial center X10 is formed on (along) an outer-circumferential surface on the vehicle-inner side of the flange part 11F that is located at the terminal end portion (tip) of the linearly-movable-shaft main body 11. The tubular surface 11B is separated from the tip surface 11A in the direction leading away from the lid body 5.

As shown in FIG. 10, the sealing part 83 is formed in a ring shape around axial center X10 while being tightly sealed against the tubular surface 11B on the vehicle-inner side of the flange part 11F, and is held on the tubular surface 11B. As shown in FIG. 9, the sealing part 83 comprises a ring-shaped protrusion 83A. The ring-shaped protrusion 83A protrudes from the outer-circumferential surface of the sealing part 83 in a substantially peak-shaped manner in cross section outward in the radial direction of axial center X10, and extends around axial center X10 so as to encircle the outer circumference of the linearly-movable-shaft main body 11.

As shown in FIGS. 10 and 11, the connection hole 11C is formed in the interior of the terminal end portion (tip) of the linearly-movable-shaft main body 11. One end of the connection hole 11C connects to the central portion of the tip surface 11A, while the other end of the connection hole 11C connects to a portion of the tubular surface 11B located in a prescribed direction around axial center X10. The connection hole 11C extends from that one end toward the vehicle-inner side centered on axial center X10, then changes direction outward in the radial direction of axial center X10, and then reaches the other end.

As shown in FIG. 10, by filling the space within the connection hole 11C, the connecting part 85 has a circular-cylindrical shape bent into a shape that is substantially L-shaped and is held in the connection hole 11C.

As shown in FIGS. 5-7, the block 20 is a substantially block-shaped member made of polymer (resin) that is fixed to the base-end portion 11H of the linearly-movable-shaft main body 11 and that is moveable integrally with the linearly-movable-shaft main body 11. As shown in FIG. 7, a shaft-shaped guide insertion hole 22, an engagement part 25, and an actuating part 27 are formed in/on the block 20.

The shaft-shaped guide insertion hole 22 is a round hole that passes, in a direction parallel to axial center X10, through a portion of the block 20 that is offset downward and forward of the linearly-movable-shaft main body 11.

Although omitted from the figures, by inserting the shaft-shaped guide 92A shown in FIG. 1 through the shaft-shaped guide insertion hole 22, the linearly-movable shaft 10 is supported by the housing 90 such that it can undergo linear reciprocating motion in (along) the direction of axial center X10.

In addition, because the shaft-shaped guide insertion hole 22 and the shaft-shaped guide 92A are offset relative to axial center X10 (i.e. offset relative to the tubular guide 91A, in which the linearly-movable shaft 10 and the rotary shaft 30 are inserted), the linearly-movable shaft 10 is supported by the housing 90 such that it is nonrotatable around axial center X10.

When the shaft-shaped guide 92A shown in FIG. 1 is inserted through the shaft-shaped guide insertion hole 22, one end of the compression-coil spring 10S makes contact with the block 20, shown in FIG. 7. Thereby, the compression-coil spring 10S biases the linearly-movable shaft 10 toward the outer side of the vehicle.

As shown in FIGS. 7 and 8, the engagement part 25 is a tilted surface that faces the outer side of the vehicle and is formed on a portion of the block 20 that is offset rearward from the linearly-movable-shaft main body 11. The engagement part 25 is tilted such that it inclines toward the inner side of the vehicle as extends in the rearward direction.

As shown in FIG. 7, the actuating part 27 is a protruding part (protrusion) that protrudes rearward from a portion of the block 20 that is offset downward from the linearly-movable-shaft main body 11.

As shown in FIG. 7, the rotary shaft 30 is a polymer (resin)member that extends in a substantially circular-tube shape centered on axial center X10. A helical groove 30J is defined as a recess or slot in an outer-circumferential surface of the rotary shaft 30. The helical groove 30J extends in a helical shape, centered on axial center X10.

The terminal end (tip) of the rotary shaft 30 is an end part of the rotary shaft 30 located on the lid body 5 side of the rotary shaft 30 in the direction of axial center X10, i.e. toward the outer side of the vehicle, and has a diameter smaller than the other portions of the rotary shaft 30. Latch protrusions 34A, 34B are formed on (at) the terminal end portion (tip) of the rotary shaft 30. The latch protrusions 34A, 34B are substantially plate-shaped protrusions that protrude, from the terminal end portion (tip) of the rotary shaft 30, outward in the radial direction of axial center X10 such that they are spaced apart from one other.

As shown in FIGS. 5 and 6, when the linearly-movable-shaft main body 11 is inserted through the rotary shaft 30, the linearly-movable-shaft main body 11 supports the rotary shaft 30 such that it is rotatable around axial center X10. In this state, the flange part 11F makes contact with a step (recess) provided on the terminal end portion (tip) of the rotary shaft 30, as shown in FIG. 10.

As shown in FIGS. 5 and 6, because the flange part 11F of the linearly-movable-shaft main body 11 and the block 20 sandwich the rotary shaft 30 in the vehicle inside-outside direction, the rotary shaft 30 is kept (blocked) from falling out of the linearly-movable-shaft main body 11. In this state, the sealing part 83 of the linearly-movable-shaft main body 11 makes contact with the interior of the rotary shaft 30 in a ring shape while the ring-shaped protrusion 83A is compression-deformed to an extent that it does not impede the rotation of the rotary shaft 30. As a result, the gap between the linearly-movable-shaft main body 11 and the rotary shaft 30 is sealed, thereby inhibiting (blocking) the ingress of foreign matter into the housing 90 via this gap.

As shown in FIGS. 1-3, the rotary shaft 30 is inserted through the interior of the tubular guide 91A of the housing 90 with the rotary shaft 30 mounted around the linearly-movable shaft 10. Although not shown in the figures, the guide protrusion 91J of the housing 90 projects into the helical groove 30J of the rotary shaft 30.

Because the outer-circumferential surface of the rotary shaft 30 is guided along (by) the guide surface 91G of the tubular guide 91A, the linearly-movable shaft 10 and the rotary shaft 30 are supported by the housing 90 such that they can undergo linear reciprocating motion in the direction of axial center X10.

Furthermore, as was described above, the linearly-movable shaft 10 is supported on the housing 90 by the shaft-shaped guide insertion hole 22 and the shaft-shaped guide 92A such that it can undergo linear reciprocating motion in the direction of axial center X10 and is nonrotatable around axial center X10.

On the other hand, because the rotary shaft 30 is rotatably supported by the linearly-movable-shaft main body 11 and the guide protrusion 91J protrudes into the helical groove 30J, the rotary shaft 30 can undergo linear reciprocating motion in the direction of axial center X10 together with the linearly-movable shaft 10 and also the rotary shaft 30 is supported on the housing 90 such that it is rotatable around axial center X10.

Therefore, the linearly-movable shaft 10 is reciprocally movable in a linear range that includes a first position shown in FIG. 1, a second position shown in FIG. 2, and a third position shown in FIG. 3.

As shown in FIG. 1, the first position of the linearly-movable shaft 10 corresponds to an open position of the lid body 5. When the linearly-movable shaft 10 is disposed in the first position, it protrudes outward from the outermost surface of the vehicle body (i.e. the outermost surface of the body panel 9A). The linearly-movable shaft 10 is also shown in the first position in FIGS. 5, 6, and 8A.

As shown in FIG. 2, the second position of the linearly-movable shaft 10 corresponds to the closed position of the lid body 5. When the linearly-movable shaft 10 is disposed in the second position, it has retracted toward the inner side of the vehicle, with the terminal end (tip) of the linearly-movable shaft 10 entering between the latching flanges 4A, 4B of the lid-body latching part 4. This causes the cushioning part 81 to make contact with the surface of the lid body 5 that faces the inner side of the vehicle, which is in the closed position. The linearly-movable shaft 10 is also shown in the second position in FIG. 8D.

As shown in FIG. 3, the third position of the linearly-movable shaft 10 corresponds to the pressed-in position of the lid body 5. When the linearly-movable shaft 10 is disposed in the third position, the cushioning part 81, which is located at the terminal end (tip) of the linearly-movable shaft 10, remains in contact with the surface of the lid body 5 that faces the inner side of the vehicle, which is in the pressed-in position, while retracting even deeper toward the inside of the opening 8 than in the second position. The linearly-movable shaft 10 is also shown in the third position in FIG. 8C.

The linearly-movable shaft 10 is biased (urged) in the vehicle outward direction by the compression-coil spring 10S shown in FIG. 7 toward the first position shown in FIG. 1.

When the linearly-movable shaft 10 is moved to the second position or the third position, the rotary shaft 30 is simultaneously rotated to the latched position shown in FIG. 2 and FIG. 3 owing to the interaction between the guide protrusion 91J of the housing 90 and the helical groove 30J of the rotary shaft 30. When the rotary shaft 30 is in the latched position, the latch protrusion 34A protrudes forward and latches the latching flange 4A of the lid-body latching part 4, and the latch protrusion 34B protrudes rearward and latches the latching flange 4B of the lid-body latching part 4. Thus, when the rotary shaft 30 is in the latched position, the lid body 5 is latched in the closed position or the pressed-in position. The rotary shaft 30 is also shown in the latched position by solid lines in FIG. 4.

On the other hand, when the linearly-movable shaft 10 moved to the first position, the rotary shaft 30 is simultaneously rotated to the unlatched position shown in FIG. 1 owing to the interaction between the guide protrusion 91J of the housing 90 and the helical groove 30J of the rotary shaft 30. When the rotary shaft 30 is in the unlatched position, the latch protrusion 34A is caused to protrude upward and be spaced apart from the latching flange 4A of the lid-body latching part 4. Furthermore, although not shown, the latch protrusion 34B is caused to protrude downward and be spaced apart from the latching flange 4B of the lid-body latching part 4. Thus, when the rotary shaft 30 is in the unlatched position, the lid body 5 is no longer latched. The rotary shaft 30 is also shown in the unlatched position by chain double-dashed lines in FIGS. 4 and 6.

Stopper

As shown in FIGS. 5-8, the stopper 50 is a polymer (resin) member, wherein a pivot-axis part 51, a fan-shaped (arcuate) gear 56, a stopper surface (engagement surface) 55, a manual-operation part (tab) 59, and a spring-seat part 53 are all integrally formed (i.e. without a seam therebetween) as a single component, i.e. the stopper 50.

The pivot-axis part 51 is supported by the housing 90 such that the stopper 50 is pivotable about pivot-axis center X50 that extends in the up-down direction.

Gear teeth are formed on the fan-shaped gear 56 and extend along an arc of a fan-shaped portion that protrudes from an upper portion of the pivot-axis part 51 toward the inner side of the vehicle.

The stopper surface 55 is formed on a substantially block-shaped portion that protrudes from a lower portion of the pivot-axis part 51 toward the inner side of the vehicle. The stopper surface 55 is a curved surface that faces the inner side of the vehicle while curving such that it traces an arc centered on pivot-axis center X50.

The manual-operation part 59 is connected to a region shifted upward and rearward of the stopper surface 55 on the substantially block-shaped portion protruding from the lower portion of the pivot-axis part 51 toward the inner side of the vehicle. The manual-operation part 59 extends toward the inner side of the vehicle while curving in a crank shape.

As shown in FIG. 4, the terminal end (tip) of the manual-operation part 59 passes through the slot 92H of the housing case 92, protrudes outside of the housing 90, and is covered by the rubber cap 92C as shown in FIG. 1. When the user moves the manual-operation part 59 by pushing on the rubber cap 92C, it becomes possible to manually pivot the stopper 50. That is, the manual-operation part 59 is provided such that it is operable (manually pushable) from the outside of the housing 90.

As shown in FIGS. 5-8, the spring-seat part 53 is formed at a position that is rearward of the pivot-axis part 51 and is spaced apart toward the inner side of the vehicle. The spring-seat part 53 protrudes toward the outer side of the vehicle. The spring-seat part 53 latches in the end part of the compression-coil spring 50S (FIG. 7) that is on the inner side of the vehicle. The compression-coil spring 50S biases the stopper 50 in the direction of displacing (pivoting) the stopper surface 55 forward.

The stopper 50 is pivotable in a range that includes (between) a blocking position shown by solid lines in FIG. 8D and a nonblocking position shown by chain double-dashed lines in FIG. 8D.

When the stopper 50 is in the blocking position shown by solid lines in FIG. 8D, the stopper surface 55 engages (contacts) the engagement part 25 formed on the block 20 of the linearly-movable shaft 10 in the second position, thereby prohibiting (blocking) the linearly-movable shaft 10 from moving from the second position to the first position. The stopper 50 is also shown in the blocking position in FIGS. 5, 6, 8A, and C. The state in which the stopper 50 (which, together with the electric actuator 60, may constitute a stopper mechanism) is disposed at (in) the blocking position serves as one representative, non-limiting example of a "blocking state of the stopper mechanism" according to the present teachings.

When the stopper 50 is in the nonblocking position shown by chain double-dashed lines in FIG. 8D, the stopper surface 55 is separated (spaced apart) from the engagement part 25 formed on the block 20 of the linearly-movable shaft 10 in the second position, thereby permitting the linearly-movable shaft 10 to move from the second position to the first position. The stopper 50 is also shown in the nonblocking position in FIG. 8B. The state in which the stopper 50 (which, together with the electric actuator 60, may constitute a stopper mechanism) is disposed at (in) the nonblocking position serves as one representative, non-limiting example of a "nonblocking state of the stopper mechanism" according to the present teachings.

The stopper 50 is biased toward the blocking position by the compression-coil spring 50S shown in FIG. 7.

Electric Actuator

As shown in FIGS. 5-7, the electric actuator 60 comprises an electric motor 61 and a worm gear 66, which are housed inside the housing 90. The electric motor 61 is electrically connected, via a wire harness W1 shown in FIG. 1, to a control part (FIG. 1) installed inside the vehicle, e.g., to an electronic control unit (ECU) or other type of processor/controller. As shown in FIG. 5, the worm gear 66 is connected to a drive shaft of the electric motor 61 so as to be rotatable therewith. The worm gear 66 meshes with the fan-shaped gear 56 of the stopper 50.

When the electric motor 61 is energized by the control part, the electric actuator 60 transmits the driving force of the electric motor 61 to the stopper 50 via the (rotating) worm gear 66 and the fan-shaped gear 56 and thereby pivots the stopper 50, against the biasing force of the compression-coil spring 50S shown in FIG. 7, from the blocking position shown in solid lines in FIG. 8D to the nonblocking position shown in chain double-dashed lines in FIG. 8D.

On the other hand, when the electric motor 61 is no longer energized, the holding force will no longer act on the worm gear 66, and therefore the electric actuator 60 will permit the stopper 50 to return to the blocking position owing to the biasing force of the compression-coil spring 50S shown in FIG. 7, as will be further explained below.

Switch Lever and Switch

As shown in FIGS. 6 and 7, the switch lever 70 and the switch SW1 are disposed inside the housing 90 downward of the electric motor 61 and the worm gear 66.

The switch lever 70 is a polymer (resin) member that includes a pivot-axis part 71, a driven part 77, and a switching part 75, which are integrally formed together as a single component. The pivot-axis part 71 is supported by the housing 90 such that the switch lever 70 is pivotable around a pivot-axis center X70 that extends in the up-down direction.

As shown in FIG. 7, the driven part 77 is a circular-cylindrical shaft that protrudes downward from the terminal end (tip) of a plate-shaped part, which terminal end (tip) extends forward from the pivot-axis part 71. The switching part 75 is composed of two circular-cylindrical shafts that are spaced apart from one another in the vehicle inside-outside direction. The two circular-cylindrical shafts respectively protrude upward from two locations on a portion of the plate-shaped part that is rearward of the pivot-axis part 71.

The switch lever 70 is biased (urged) by a torsion coil spring (not shown) toward (in) the counterclockwise direction in the plane of the paper in FIG. 6 around pivot-axis center X70.

As shown in FIG. 7, the switch SW1 comprises a movable protrusion (lever) SW1A. The movable protrusion SW1A protrudes forward from a front surface of the switch SW1 and is sandwiched (interleaved) between the two circular-cylindrical shafts of the switching part 75 in the vehicle inside-outside direction.

When the switching part 75 of the pivoting switch lever 70 pushes the movable protrusion SW1A in the vehicle inside-outside direction and thereby displaces the movable protrusion SW1A in the vehicle inside-outside direction, the switch SW1 switches between a disconnected state and a connected state, i.e. changes its connection state. The same as with the electric motor 61, the switch SW1 is electrically connected by the wire harness W1 shown in FIG. 1 to the control part.

The control part ascertains whether the switch SW1 has been switched to the disconnected state or the connected state, and as needed, utilizes information from other switches, sensors, or the like, to determine whether a manual opening operation or a manual closing operation (further described below) has been performed by the user on the lid body 5, and also stores the state (disconnected or connected) of the switch SW1.

When the linearly-movable shaft 10 is in the first position shown in FIG. 6, the actuating part 27 of the linearly-movable shaft 10 is most spaced apart from the driven part 77 of the switch lever 70. At this time, the switch SW1 changes to (assumes) the disconnected state because the switch lever 70 is biased by the torsion coil spring (not shown), thereby causing the movable protrusion SW1A to be displaced toward the inner side of the vehicle. It is noted that, in the present embodiment, the switch SW1 functions by disconnecting and connecting a single current path, but the present invention is not limited to this configuration. Instead, for example, the switch SW1 may be configured/adapted such that, when the movable protrusion SW1A has been displaced toward the inner side of the vehicle, the switch SW1 may put a different current path into the connected state.

Although not shown in the figures, as the linearly-movable shaft 10 displaces from the first position toward the second position, the actuating part 27 makes contact with the driven part 77, and thereafter until the linearly-movable shaft 10 reaches the third position, the torsion coil spring (not shown) biases the switch lever 70 such that the driven part 77 is pressed against the actuating part 27. Thereby, the switch lever 70 interacts with the linearly-movable shaft 10. Then, when the linearly-movable shaft 10 reaches the third position, because the switch lever 70 is displacing the movable protrusion SW1A toward the outer side of the vehicle, the switch SW1 switches from the disconnected state to the connected state.

On the other hand, when the linearly-movable shaft 10 displaces from the third position to the first position, because the switch lever 70, which is interacting with the linearly-movable shaft 10, is pivoted in the counterclockwise direction of FIG. 6 by the biasing force of the torsion coil spring (not shown), the switch SW1 switches from the connected state to the disconnected state. Then, when the linearly-movable shaft 10 passes the second position and the actuating part 27 separates from the driven part 77, the switch lever 70 no longer interacts with the linearly-movable shaft 10.

Lid-Body Opening/Closing Actions

The lid-body opening/closing apparatus 1 having the above-described configuration opens and closes the lid body 5 as described below. The following explanation will begin starting from the state in which the lid body 5 is in the first position, where the opening 8 is open, as shown by the chain double-dashed lines in FIG. 1.

In this state, based on information from the switch SW1 and the like, the control part records (stores in memory) that the status is after the user has performed a manual opening operation.

If the user then pushes in the lid body 5 shown by chain double-dashed lines in FIG. 1 toward the inner side of the vehicle to the state (position) indicated by solid lines in FIG. 1, then the terminal end (tip) of the linearly-movable shaft 10 in the first position and the tip of the rotary shaft 30 in the unlatched position enter into the lid-body latching part 4 of the lid body 5, and the cushioning part 81 of the linearly-movable shaft 10 makes contact with the surface of the lid body 5 that faces the inner side of the vehicle, thus absorbing the impact.

If the user then further pushes the lid body 5 against the biasing force of the compression-coil spring 10S toward the inner side of the vehicle, the lid body 5 will pass the closed position shown in FIG. 2 and reach the pressed-in position shown in FIG. 3. At this time, the linearly-movable shaft 10 passes the second position and reaches the third position. The rotary shaft 30 moves linearly together with the linearly-movable shaft 10 while rotating from the unlatched position to the latched position, thus latching the latch protrusions 34A, 34B to the lid-body latching part 4 and thereby latching the lid body 5.

In addition, at this time, as shown in FIG. 8B, the stopper 50 is pushed in the rearward direction by a rear-end surface of the block 20 of the linearly-movable shaft 10 and thereby pivots from the blocking position to the nonblocking position against the biasing force of the compression-coil spring 50S. Therefore, the linearly-movable shaft 10 is permitted to pass through the second position to the third position.

Then, as shown in FIG. 8C, after the linearly-movable shaft 10 has passed the second position and approaches the third position, the stopper 50 is pivoted back to the blocking position by the biasing force of the compression-coil spring 50S. At this time, the stopper surface 55 opposes, from the outer side of the vehicle, the engagement part 25 of the linearly-movable shaft 10, with a gap between them as shown in FIG. 8C.

Thereafter, when the user takes their hand off the lid body 5, the linearly-movable shaft 10 displaces from the third position back to the second position owing to the biasing force of the compression-coil spring 10S as shown in solid lines in FIG. 8D. Then, because the stopper surface 55 of the stopper 50 is disposed in the blocking position where it engages with (blocks movement of) the engagement part 25 of the linearly-movable shaft 10, the linearly-movable shaft 10 is held at the second position.

During the time period while the user is performing the manual closing operation to close the lid body 5 as described above, although not shown in the figures, the switch lever 70 interacts with the linearly-movable shaft 10 starting from a midway point in the displacement of the linearly-movable shaft 10 toward the third position. Then, when the linearly-movable shaft 10 has displaced to the third position, the switch SW1 is switched to the connected state.

Based on the record (stored status) that the status is after the user has performed a manual opening operation, the control part determines that the switching of the switch SW1 from the disconnected state to the connected state is associated with a manual closing operation being performed by the user, and determines that there is no need to energize the electric motor 61 of the electric actuator 60.

Thereafter, when the user takes their hand off the lid body 5, although not shown in the figures, the switch lever 70 continues to interact with the linearly-movable shaft 10 while the linearly-movable shaft 10 displaces from the third position to the second position, thereby causing the switch SW1 to be switched to the disconnected state.

The control part determines that the switching of the switch SW1 from the connected state to the disconnected state is associated with the completion of the manual closing operation performed by the user and records (stores) this fact (status).

To pivot the lid body 5 held at the closed position shown in FIG. 2 to the open position shown in FIG. 1, the user performs a manual opening operation by pressing in the lid body 5 from the closed position to the pressed-in position shown in FIG. 3. Thereby, as shown in FIG. 8C, the linearly-movable shaft 10 moves from the second position and reaches the third position while the stopper 50 remains in the blocking position. At this time, although not shown in the figures, the switch lever 70 interacts with the linearly-movable shaft 10 while the linearly-movable shaft 10 displaces (moves) from the second position to the third position, thereby causing the switch SW1 to be switched to the connected state.

If the control part ascertains that the switch SW1 was changed to the connected state after having recorded that the manual closing operation performed by the user was completed, then the control part determines that a manual opening operation of the user has been performed. Therefore, owing to the fact that the control part has detected a manual opening operation being performed by the user, the control part energizes the electric motor 61 of the electric actuator 60, which causes the stopper 50 to be pivoted to the nonblocking position shown by chain double-dashed lines in FIG. 8D.

That is, after the lid body 5 has been held in the closed position, the electric actuator 60 is energized as a consequence of the switch SW1 having been put into the connected state, and thus rotation of the worm gear 66 causes the stopper 50 to be pivoted to the nonblocking position.

When the stopper 50 has been pivoted to the nonblocking position (as shown by chain double-dashed lines in FIG. 8D) such that the stopper surface 55 of the stopper 50 is separated (spaced apart) from the engagement part 25 of the linearly-movable shaft 10, the linearly-movable shaft 10 is permitted to pass the second position and displaces to the first position shown in FIG. 8A owing to the biasing force of the compression spring 10S. Consequently, the lid body 5 passes the closed position shown in FIG. 2 and pivots to the open position shown by solid lines in FIG. 1.

At this time, the rotary shaft 30 rotates from the latched position shown in FIG. 2 to the unlatched position shown in FIG. 1 while moving linearly together with the linearly-movable shaft 10, The rotation of the rotary shaft 30 causes the latch protrusions 34A, 34B to separate from the lid-body latching part 4, and thereby the lid body 5 is no longer latched. As a result, the user can pivot the lid body 5 farther to the open position shown by chain double-dashed lines in FIG. 1.

During this time period, although not shown in the figures, the switch lever 70 interacts with the linearly-movable shaft 10, which causes the switch SW1 to be switched to the disconnected state. Thereafter, because the actuating part 27 separates from the driven part 77, the switch lever 70 no longer interacts with the linearly-movable shaft 10.

When the control part ascertains that the switch SW1 has switched to the disconnected state after the energizing of the electric motor 61 has started, the control part determines that the user has taken their hand off the lid body 5 and that the linearly-movable shaft 10 has been displaced to the first position shown in FIG. 8A. Then, the control part records (stores the status) that the manual opening operation performed by the user is complete and that the lid body 5 has pivoted to the open position, and also halts the energizing of the electric motor 61. As a result, the stopper 50 is returned to the blocking position by the biasing force of the compression-coil spring 50S.

It is noted that, in the event that the electric actuator 60 does not operate, for example during repair work or at the time of an anomaly, such as when the battery is disconnected or completely discharged, there are situations in which the user must pivot the lid body 5 held at the closed position shown in FIG. 2 to the open position shown in FIG. 1. In these situations, the user may press the manual-operation part 59 rearward to manually pivot the stopper 50 from the blocking position to the nonblocking position, and thereby the lid body 5 can be pivoted to the open position shown in FIG. 1.

Functions and Effects

In the lid-body opening/closing apparatus 1 of the working example, as shown in FIG. 10, because the ring-shaped protrusion 83A of the sealing part 83 makes ring-shaped contact with the inside of the rotary shaft 30 while undergoing compression-deformation to an extent that the rotation of the rotary shaft 30 is not impeded, the sealing part 83 seals the gap between the rotary shaft 30 and the linearly-movable-shaft main body 11. Thereby, it is possible to inhibit the ingress of foreign matter, such as dust and liquids, into that gap.

In addition, as shown in FIG. 9, the cushioning part 81 protrudes from the linearly-movable-shaft main body 11 toward the lid body 5. Furthermore, as shown in FIGS. 1-3, the cushioning part 81 absorbs the impact at the time that the linearly-movable shaft 10 comes into contact with the pivoting lid body 5. For this reason, in the lid-body opening/closing apparatus 1, impacts tend not to act on the linearly-movable-shaft main body 11 and the rotary shaft 30, and therefore backlash between the linearly-movable-shaft main body 11 and the rotary shaft 30 can be reduced.

Accordingly, with the lid-body opening/closing apparatus 1 of the working example, it is possible to avoid a decrease in the closure-tightness capability, which holds the lid body 5 in the closed position, and to reduce the occurrence of abnormal noise. In addition, in the lid-body opening/closing apparatus 1, as shown in FIG. 10, because the cushioning part 81 and the sealing part 83 are connected by (via) the connecting part 85 within the linearly-movable-shaft main body 11, the linearly-movable-shaft main body 11 and the elastic body 80 can be easily integrated by manufacturing them using a two-color molding process. More specifically, a two-color (multi-material) injection molding manufacturing process includes a plurality of steps to mold the different materials. Such a manufacturing process makes it possible to achieve a reduction in the part count and a simplification of the assembly work, and, in turn, to lower manufacturing costs. In addition, because the cushioning part 81 is connected by (via) the connecting part 85 to the sealing part 83, the cushioning part 81 is not readily separated (detachable) from the linearly-movable-shaft main body 11 and it is also reinforced by the linearly-movable-shaft main body 11. Therefore, durability is improved and the volume of the cushioning part 81 can be increased (because the cushioning part 81 extends longitudinally into the hollow interior of the linearly-movable-shaft main body 11), thereby increasing impact-absorbing performance.

In addition, in the lid-body opening/closing apparatus 1, as shown in FIGS. 1-3, the cushioning part 81 protrudes in a tapered (rounded) manner toward the lid body 5. Thereby, the cushioning part 81 can even more effectively absorb an impact at the time of impact with the lid body 5.

Furthermore, on the lid-body opening/closing apparatus 1, as shown in FIG. 10, the flange part 11F protrudes outward in the radial direction of axial center X10 between the cushioning part 81 and the sealing part 83. Thus, the flange part 11F is formed on (at) the tip of the linearly-movable-shaft main body 11 to support/contact the rotary shaft 30. More specifically, the flange part 11F of the linearly-movable-shaft main body 11 is composed of a material harder than that of the elastic body 80 and comes into contact with a step (recess) provided in the terminal end portion (tip) of the rotary shaft 30. Therefore, rotational resistance (friction) between the rotary shaft 30 and the linearly-movable shaft 10 can be effectively reduced so that the rotary shaft 30 can rotate stably and smoothly around axial center X10.

In addition, as shown in FIG. 11, the tip surface 11A, the tubular surface 11B, and the connection hole 11C are formed on the linearly-movable-shaft main body 11 of the lid-body opening/closing apparatus 1. Furthermore, the cushioning part 81, the sealing part 83, and the connecting part 85 of the elastic body 80 are formed by the cavity CA1, which includes the tip surface 11A, the tubular surface 11B, and the connection hole 11C. Owing to this configuration, the lid-body opening/closing apparatus 1 can be manufactured according to a multi-material (two-color) injection molding process by first molding the linearly-movable-shaft main body 11, whereon the tip surface 11A, the tubular surface 11B, and the connection hole 11C are formed, using a slide core. Then, the cushioning part 81, the sealing part 83, and the connecting part 85 are molded integrally with the linearly-movable-shaft main body 11. More specifically, the cushioning part 81, the sealing part 83, and the connecting part 85 are formed using the cavity CA1, which includes the tip surface 11A, the tubular surface 11B, and the connection hole 11C.

Although a non-limiting embodiment of the present teachings was described above based on a working example, the present invention is not limited to the above-mentioned working example and of course is applicable when changed appropriately within a scope that does not depart from the gist thereof.

For example, in the working example, the stopper mechanism comprises the stopper 50 and the electric actuator 60, but the present invention is not limited to this configuration. For example, the electric actuator 60 may be eliminated from the stopper mechanism and the stopper 50 may be pivoted to the nonblocking position solely by manual operation.

In the working example, the lid body 5 is displaceable in a range that includes (between) the open position, the closed position, and the pressed-in position, and the linearly-movable shaft 10 is capable of undergoing linear reciprocating motion in a range that includes (between) the first position, the second position, and the third position, but the present invention is not limited to this configuration. For example, the present teachings encompass configurations in which the lid body 5 is modified such that it is displaceable between the open position and the closed position; the linearly-movable shaft 10 is modified such that it is capable of undergoing linear reciprocating motion between the first position and the second position; and the electric actuator 60 is modified such that the stopper 50 is caused to pivot to the nonblocking position by a manual opening operation performed using an OPEN switch provided within the cabin or on a remote-control key.

In the working example, the fuel-filling hole 8H is disposed inside the opening 8, but the present invention is not limited to this configuration. For example, a charging connector (electronic charging port for an electric vehicle) or the like may instead be disposed inside the opening. In addition, in the working example, electrical connection to the control part is achieved via the wire harness W1 that extends from the housing 90, but the present invention is not limited to this configuration. For example, an electrical connector may be provided in the housing and that electrical connector may be connected to a matching connector electrical provided inside the vehicle body.

The present invention may be utilized, e.g., in an automobile, bus, industrial vehicle, or other vehicle.

Additional embodiments of the present teachings include, but are not limited to:

1. A lid-body opening/closing apparatus (1) for use in a vehicle provided between an opening (8), which is provided on a vehicle body (9), and a lid body (5), which is capable of opening and closing the opening (8), wherein:

the lid body (5) is displaceable in a range that includes: an open position at which the opening (8) is open, and a closed position at which the opening (8) is closed; and the lid-body opening/closing apparatus (1) comprises:

a housing (90) provided on the vehicle body (9);

a linearly-movable shaft (10) that (i) extends centered on an axial center (X10) passing through the opening (8), (ii) is supported by the housing (90) such that the linearly-movable shaft (10) is capable of undergoing linear reciprocating motion in the direction of the axial center (X10) in a range that includes a first position corresponding to the open position, and a second position corresponding to the closed position, and such that the linearly-movable shaft (10) is nonrotatable around the axial center (X10), and (iii) is biased toward the first position;

a rotary shaft (30) that (i) extends in a substantially cylindrical shape centered on the axial center (X10), and (ii) is mounted around the linearly-movable shaft (10) such that the rotary shaft (30) is capable of undergoing linear reciprocating motion in the direction of the axial center (X10), and such that the rotary shaft (30) is rotatable around the axial center (X10); wherein, when the linearly-movable shaft (10) is disposed in the second position, the rotary shaft (30) rotates to a latched position that latches the lid body (5); and when the linearly-movable shaft (10) is disposed in the first position, the rotary shaft (30) rotates to an unlatched position that does not latch the lid body (5); and a stopper mechanism (50, 60) that is provided on the housing (90) and switches between a blocking state, in which movement of the linearly-movable shaft (10) from the second position to the first position is prohibited, and a nonblocking state, in which movement of the linearly-movable shaft (10) from the second position to the first position is permitted;

wherein:

the linearly-movable shaft (10) comprises:

a linearly-movable-shaft main body (11), which is inserted through the interior of the rotary shaft (30); and an elastic body (80), which is provided on a terminal end portion of the linearly-movable-shaft main body (11) and is composed of a material that is softer than the material constituting the linearly-movable-shaft main body (11); and the elastic body (80) comprises:

a cushioning part (81), which protrudes from the linearly-movable-shaft main body (11) toward the lid body (5);

a sealing part (83), which makes ring-shaped contact within the rotary shaft (30); and a connecting part (85), which connects the cushioning part (81) to the sealing part (83) within the linearly-movable-shaft main body (11).

2. The lid-body opening/closing apparatus (1) according to the above aspect 1, wherein the cushioning part (81) protrudes in a tapered manner toward the lid body (5).

3. The lid-body opening/closing apparatus (1) according to the above aspect 1 or 2, wherein a flange part (11F) is formed on (at) the terminal end portion of the linearly-movable-shaft main body (11) such that it protrudes outward in the radial direction of the axial center (X10) between the cushioning part (81) and the sealing part (83) and makes contact with a terminal end of the rotary shaft (30).

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved apparatuses and actuators for opening and closing a fuel door (lid body) of a vehicle.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Furthermore, it is noted that the fan-shaped gear 56 and the worm gear 66 are preferably designed to provide a "backdriving" worm gear (pinion) arrangement, in which rotation of the fan-shaped gear 56 (driven component) caused by an external load (e.g., the compression-coil spring 50S that biases/urges the stopper 50 to pivot towards the blocking position) is applied to the worm gear 66 (driving component, also known as a pinion) when the electric motor 61 is not being energized to drive the worm gear 66. That is, a "backdriving" operation occurs when the fan-shaped gear (arcuate gear) 56 actively drives (rotates) the worm gear (pinion) owing to the fact that the worm gear 66 is free to rotate when the electric motor 61 is not being driven (energized). Such an arrangement is known as a non-self-locking worm gear (pinion) arrangement and may be constructed by appropriately designing the outer diameter of the worm gear (pinion) 66, the thread lead of the worm gear 66, the resulting thread angle of the worm gear 66, as well as providing low friction surface finishes (low coefficient of friction) on the fan-shaped gear 56 and the worm gear 66. For example, the thread angle of the worm gear 66 is preferably equal to or greater than 10°. The worm gear 66 and/or fan-shaped gear 56 may be lubricated to further reduce friction. Thus, referring to FIG. 5, energization (driving) of the electric motor 61 causes the worm gear 66 to rotate and pivot the fan-shaped gear 56 (and thus the stopper 50) in the counterclockwise direction toward the nonblocking position of the stopper 50. When the energization is stopped, the worm gear 66 is free to rotate in the opposite rotational direction, so that the fan-shaped gear 56 (and thus the stopper 50) pivot in the clockwise direction toward the blocking position of the stopper 50 owing to the biasing force of the compression-coil spring 50S that is normally biasing (pivoting) the stopper 50 toward the blocking position. Generally speaking, a non self-locking worm gear arrangement can be designed by setting the lead angle of the worm gear 66 to be greater than the friction angle, which is the arc tangent of the coefficient of friction of the contacting surfaces of the worm gear 66 and the fan-shaped gear 56.

EXPLANATION OF THE REFERENCE NUMBERS

1 Lid-body opening/closing apparatus for use in a vehicle
9 Vehicle body
8 Opening
5 Lid body
90 Housing
X10 Axial center
10 Linearly-movable shaft
30 Rotary shaft
50, 60 Stopper mechanism (50: stopper, 60: electric actuator)
11 Linearly-movable-shaft main body
80 Elastic body
81 Cushioning part
83 Sealing part
85 Connecting part
11F Flange part
11A Tip surface
11B Tubular surface
11C Contact hole
CA1 Cavity

I claim:

1. An apparatus for opening and closing a lid of a vehicle, wherein at least a portion of the apparatus is provided between an opening on a vehicle body and the lid that is configured to open and close the opening, and
the lid is displaceable in a range that includes: an open position and a closed position; and
the apparatus comprises:
a housing affixed to the vehicle body;
a linearly-movable shaft that:
(i) extends centered on an axial center passing through the opening,
(ii) is supported by the housing such that the linearly-movable shaft is configured to undergo linear reciprocating motion in the direction of the axial center in a range that includes a first position corresponding to the open position and a second position corresponding to the closed position, and such that the linearly-movable shaft is configured not to rotate around the axial center, and
(iii) is biased toward the first position;
a rotary shaft that (i) extends in a substantially cylindrical shape centered on the axial center, and (ii) is mounted around the linearly-movable shaft such that the rotary shaft is configured to undergo linear reciprocating motion in the direction of the axial center, and such that the rotary shaft is configured to rotate around the axial center; wherein, when the linearly-movable shaft is disposed in the second position, the rotary shaft is configured to be rotated to a latched position that latches the lid, and when the linearly-movable shaft is disposed in the first position, the rotary shaft is configured to be rotated to an unlatched position that does not latch the lid; and
a stopper mechanism that is:
(i) supported by the housing, and
(ii) switchable between a blocking state and a nonblocking state, in the blocking state, movement of the linearly-movable shaft from the second position to the first position is prohibited, and in the nonblocking state, movement of the linearly-movable shaft from the second position to the first position is permitted;
wherein:
the linearly-movable shaft comprises:
a linearly-movable-shaft main body inserted through an interior of the rotary shaft and being made of a first material; and
an elastic body provided on a terminal end portion of the linearly-movable-shaft main body, the elastic body being composed of a second material that is softer than the first material; and
the elastic body comprises:
a cushioning part protruding from the linearly-movable-shaft main body toward the lid;
a ring-shaped sealing part that contacts an inner circumference of the rotary shaft; and
a connecting part that connects the cushioning part to the sealing part within the linearly-movable-shaft main body.

2. The apparatus according to claim 1, wherein the cushioning part protrudes in a tapered shape toward the lid.

3. The apparatus according to claim 2, wherein:
the linearly-movable-shaft main body further includes a flange part disposed on the terminal end portion of the linearly-movable-shaft main body, and
the flange part protrudes outward in the radial direction of the axial center between the cushioning part and the sealing part and is configured to make contact with a terminal end of the rotary shaft.

4. The apparatus according to claim 3, wherein the terminal end of the rotary shaft has a recessed step surrounding an inner circumferential passageway through the rotary shaft and the flange part is configured to rotatably slide along the recessed step.

5. The apparatus according to claim 4, wherein the cushioning part extends longitudinally into the linearly-movable-shaft main body such that the cushioning part extends longitudinally deeper into the linearly-movable-shaft main body than the flange part.

6. The apparatus according to claim 5, wherein the cushioning part, the sealing part and the connecting part are integrally connected without a seam therebetween.

7. The apparatus according to claim 6, wherein:
a connection hole extends in a curved shape from a first opening in a tip surface of the linearly-movable-shaft main body to a second opening on an outer circumferential surface of the linearly-movable-shaft main body, and
the connecting part extends through the connection hole.

8. The apparatus according to claim 7, wherein the sealing part extends around the entire outer circumferential surface of the linearly-movable-shaft main body and sealingly and slidably contacts the inner circumferential passageway of the rotary shaft.

9. The apparatus according to claim 8, wherein the cushioning part has a peak in the direction towards the lid and the peak is intersected by the axial center.

10. The apparatus according to claim 9, wherein:
the sealing part includes a ring-shaped protrusion that radially outwardly protrudes in a substantially peak-shaped manner and extends around the axial center so as to encircle the outer circumference surface of the linearly-movable-shaft main body, and
the ring-shaped protrusion sealingly contacts the rotary shaft.

11. The apparatus according to claim 10, wherein:
the linearly-movable-shaft main body comprises nylon, acrylonitrile butadiene styrene, or polycarbonate; and
the elastic body is composed of rubber or an elastomer.

12. The apparatus according to claim 1, wherein:
the linearly-movable-shaft main body further includes a flange part disposed on the terminal end portion of the linearly-movable-shaft main body, and
the flange part protrudes outward in the radial direction of the axial center between the cushioning part and the sealing part and is configured to make contact with a terminal end of the rotary shaft.

13. The apparatus according to claim 12, wherein the terminal end of the rotary shaft has a recessed step surrounding an inner circumferential passageway through the rotary shaft and the flange part is configured to rotatably slide along the recessed step.

14. The apparatus according to claim 12, wherein the cushioning part extends longitudinally into the linearly-movable-shaft main body such that the cushioning part extends longitudinally deeper into the linearly-movable-shaft main body than the flange part.

15. The apparatus according to claim 1, wherein the cushioning part, the sealing part and the connecting part are integrally connected without a seam therebetween.

16. The apparatus according to claim 1, wherein:
a connection hole extends in a curved shape from a first opening in a tip surface of the terminal end portion of the linearly-movable-shaft main body to a second opening on an outer circumferential surface of the linearly-movable-shaft main body, and
the connecting part extends through the connection hole.

17. The apparatus according to claim 1, wherein the sealing part extends around an entire outer circumferential surface of the linearly-movable-shaft main body and sealingly and slidably contacts an inner circumferential passageway of the rotary shaft.

18. The apparatus according to claim 1, wherein:
the cushioning part has a peak in the direction towards the lid and the peak is intersected by the axial center,
the sealing part includes a ring-shaped protrusion that radially outwardly protrudes in a substantially peak-shaped manner and extends around the axial center so as to encircle an outer circumference surface of the linearly-movable-shaft main body, and
the ring-shaped protrusion sealingly contacts the rotary shaft.

19. The apparatus according to claim 1, wherein:
the linearly-movable-shaft main body comprises nylon, acrylonitrile butadiene styrene, or polycarbonate; and
the elastic body is composed of rubber or an elastomer.

20. An apparatus for opening and latching a lid of a vehicle, comprising:
a housing configured to be affixed to a body of the vehicle;
a linearly-movable shaft supported by the housing to be reciprocally movable relative to the housing along an axial centerline in a linear range that includes a first position corresponding to an open position of the lid and a second position corresponding to a closed position of the lid;
a hollow-cylindrical rotary shaft disposed around the linearly-movable shaft and being rotatable about the axial centerline relative to the linearly-movable shaft; and
a stopper pivotably supported by the housing so as to be pivotable between a blocking position that blocks movement of the linearly-movable shaft from the second position to the first position and a nonblocking position that does not block the linearly-movable shaft from moving from the second position to the first position,
wherein the linearly-movable shaft includes a main body disposed within the hollow-cylindrical rotary shaft and an elastic member provided on a terminal end portion of the main body,
the main body is made of a first material and the elastic member is made of a second material that is more elastic than the first material, and
the elastic member includes a cushioning part protruding from the main body toward the lid, a ring-shaped sealing part surrounding an outer circumference of the main body and sealingly contacts an inner circumference of the rotary shaft, and a connecting part that connects the cushioning part to the sealing part within the main body.

* * * * *